US010571601B2

(12) United States Patent
Freeman et al.

(10) Patent No.: US 10,571,601 B2
(45) Date of Patent: Feb. 25, 2020

(54) GEOLOGIC FAULT REPRESENTATION FOR FLOW SIMULATION

(71) Applicant: Schlumberger Technology Corporation, Sugar Land, TX (US)

(72) Inventors: Stephen Freeman, Leeds (GB); Stephen Grenfell, Leeds (GB); Simon Harris, Leeds (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 869 days.

(21) Appl. No.: 14/877,164

(22) Filed: Oct. 7, 2015

(65) Prior Publication Data

US 2016/0103246 A1    Apr. 14, 2016

Related U.S. Application Data

(60) Provisional application No. 62/061,695, filed on Oct. 9, 2014.

(51) Int. Cl.
*G01V 99/00* (2009.01)

(52) U.S. Cl.
CPC .................. *G01V 99/005* (2013.01)

(58) Field of Classification Search
None
See application file for complete search history.

(56) References Cited

U.S. PATENT DOCUMENTS

| 6,128,577 | A  | * | 10/2000 | Assa | G01V 11/00 |
| | | | | | 702/2 |
| 8,635,052 | B1 | | 1/2014 | Mallet et al. | |
| 8,743,115 | B1 | * | 6/2014 | Mallet | G01V 1/302 |
| | | | | | 345/424 |
| 2004/0230379 | A1 | * | 11/2004 | Houck | G01V 1/003 |
| | | | | | 702/14 |
| 2005/0114030 | A1 | * | 5/2005 | Liu | G01V 3/20 |
| | | | | | 324/324 |
| 2008/0021684 | A1 | * | 1/2008 | Dulac | G01V 11/00 |
| | | | | | 703/9 |
| 2008/0103743 | A1 | * | 5/2008 | Howell | E21B 49/00 |
| | | | | | 703/10 |
| 2008/0243454 | A1 | * | 10/2008 | Mallet | G01V 11/00 |
| | | | | | 703/6 |

(Continued)

FOREIGN PATENT DOCUMENTS

| EP | 2631685 A2 | 8/2013 |
| WO | 2011059535 A1 | 5/2011 |

OTHER PUBLICATIONS

Examination Report issued in related GB application GB1517787.6 dated Mar. 14, 2016, 10 pages.

(Continued)

*Primary Examiner* — J. H. Hur

(57) ABSTRACT

A method can include mapping a stairstepped grid to a surface where the stairstepped grid and the surface represent a discontinuity in a geologic environment; based at least in part on the mapping, adjusting properties associated with the stairstepped grid to compensate for spatial discrepancies between the stairstepped grid and the surface; and simulating flow in the geologic environment using the stairstepped grid and the adjusted properties.

19 Claims, 20 Drawing Sheets

(56) References Cited

U.S. PATENT DOCUMENTS

| | | | |
|---|---|---|---|
| 2011/0015910 A1* | 1/2011 | Ran | G06T 17/20 |
| | | | 703/2 |
| 2012/0022837 A1 | 1/2012 | Asbury et al. | |
| 2012/0136636 A1 | 5/2012 | Kleine et al. | |
| 2012/0265510 A1* | 10/2012 | Lepage | G01V 99/005 |
| | | | 703/9 |
| 2013/0124161 A1* | 5/2013 | Poudret | G01V 99/005 |
| | | | 703/2 |
| 2013/0218539 A1* | 8/2013 | Souche | G06F 17/5009 |
| | | | 703/2 |
| 2014/0052427 A1* | 2/2014 | Yahiaoui | G06T 17/05 |
| | | | 703/10 |
| 2016/0035130 A1* | 2/2016 | Branets | G01V 99/005 |
| | | | 345/420 |

OTHER PUBLICATIONS

Examination Report for the equivalent GB patent application 1517787.6 dated Feb. 14, 2019.

* cited by examiner

Method 710

Method 910

GRID, EDIT Sections

920

Calculate Pore Volumes, Transmissibilities, Depths and NNCs.

↓

PROPS, REGIONS, SOLUTION Sections

940

Initialize, calculate initial saturations, pressures and fluids in place

↓

SCHEDULE Section

960

Define wells and surface facilities. Advance through time by material balance for ind. cells with wells as sinks or sources Geology 1010

Fault Pillar Grid
1020

Stairstep Grid
1030

GEOLOGIC FAULT REPRESENTATION FOR FLOW SIMULATION

RELATED APPLICATION

This application claims priority to and the benefit of a U.S. Provisional application having Ser. No. 62/061,695, filed 9 Oct. 2014, which is incorporated by reference herein.

BACKGROUND

Phenomena associated with a sedimentary basin may be modeled using various equations. For application of a numerical technique, such equations may be discretized using a grid that includes nodes, cells, etc. Where a basin includes various types of features (e.g., stratigraphic layers, faults, etc.), nodes, cells, etc., of a grid may represent, or be assigned to, such features. In turn, discretized equations may better represent the basin and its features. Various examples of technologies, techniques, etc., described herein pertain to grids that may represent, for example, physical structures.

SUMMARY

A method can include mapping a stairstepped grid to a surface where the stairstepped grid and the surface represent a discontinuity in a geologic environment; based at least in part on the mapping, adjusting properties associated with the stairstepped grid to compensate for spatial discrepancies between the stairstepped grid and the surface; and simulating flow in the geologic environment using the stairstepped grid and the adjusted properties. A system can include a processor; memory operatively coupled to the processor; and one or more modules that include processor-executable instructions stored in the memory to instruct the system, where the instructions include instructions to map a stairstepped grid to a surface where the stairstepped grid and the surface represent a discontinuity in a geologic environment; based at least in part on mapping of the stairstepped grid to the surface, adjust properties associated with the stairstepped grid to compensate for spatial discrepancies between the stairstepped grid and the surface; and simulate flow in the geologic environment using the stairstepped grid and the adjusted properties. One or more computer-readable storage media can include computer-executable instructions to instruct a computer where the instructions include instructions to: map a stairstepped grid to a surface where the stairstepped grid and the surface represent a discontinuity in a geologic environment; based at least in part on mapping the stairstepped grid to the surface, adjust properties associated with the stairstepped grid to compensate for spatial discrepancies between the stairstepped grid and the surface; and simulate flow in the geologic environment using the stairstepped grid and the adjusted properties. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
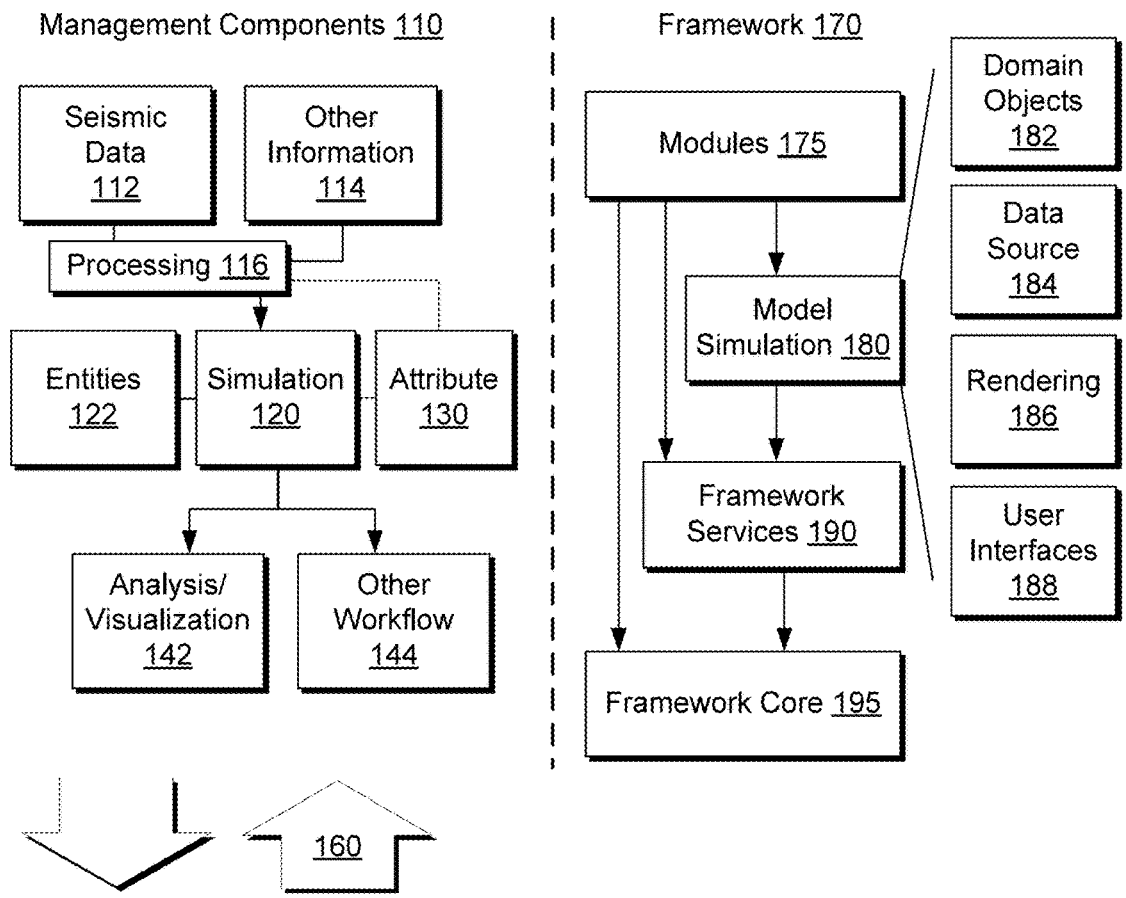
FIG. 1 illustrates an example system that includes various components for modeling a geologic environment and various equipment associated with the geologic environment.
Figure 1:
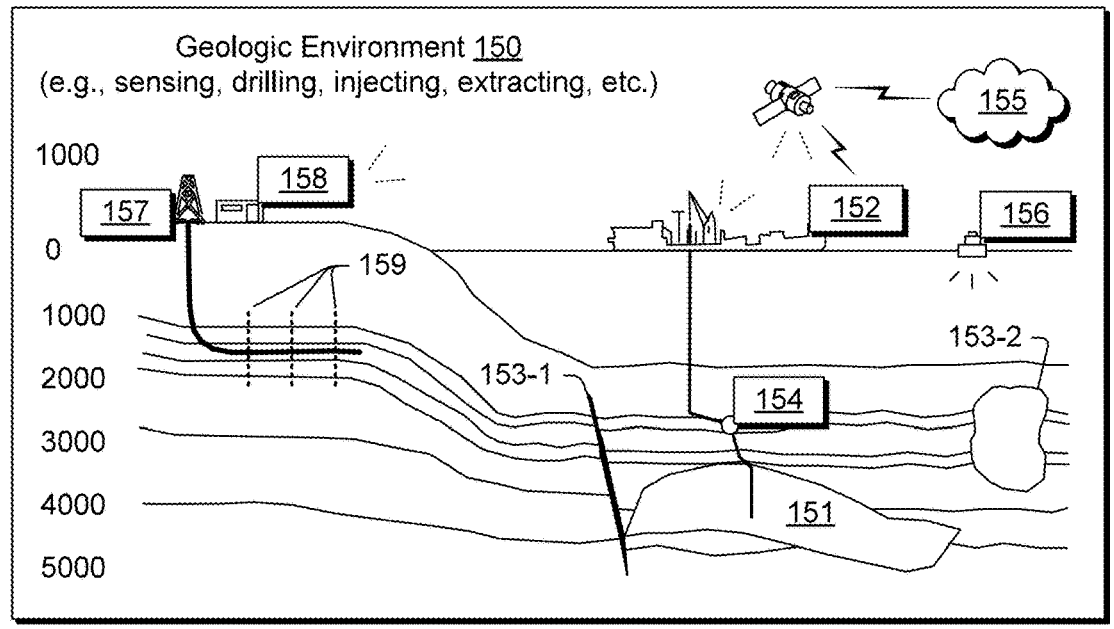

This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using various equations (e.g., stress, fluid flow, phase, etc.). As an example, a numerical model of a basin may find use for understanding various processes related to exploration and production of natural resources (estimating reserves in place, drilling wells, forecasting production, etc.).

For application of a numerical technique, equations may be discretized using a grid that includes nodes, cells, etc. For example, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multi-dimensional "elements". For one spatial dimension, an element may be represented by two nodes positioned along a spatial coordinate. For multiple spatial dimensions, an element may include any number of nodes. Further, some equations may be represented by all nodes while others are represented by fewer than all nodes (e.g., consider an example for the Navier-Stokes equations where fewer than all nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As an example, a finite volume flow simulator may simulate phenomena using a grid where grid cells defined by the grid may include 6 faces (e.g., cuboid) addressable through three indices (e.g., such that the grid may be deemed a "structured" grid) and that geometry of the grid abides by one or more conditions (e.g., cells do not cross geologic faults and cells do not cross geologic horizons). As an example, in an effort to meet a geologic fault condition, a grid may be offset across one or more geologic faults. Construction of such a grid in a domain where topology of a fault network is complex (e.g., numerous X and Y-shaped intersections) may be non-trivial and demand resources that scale nonlinearly with increasing fault network complexity.

As an example, an approach to modeling of a sedimentary basin can include a pillar grid composed of nodes, pillars and cells. For example, in three-dimensions, eight nodes may define a cell, which may be referred to as a grid cell (e.g., a pillar grid cell). In a pillar grid model, grid cells may be indexed in an indexical domain using indexes i, j, and k (e.g., an indexical coordinate system or space, which may be represented as I, J, and K or other characters, symbols, etc.). For example, a cubic grid cell (i.e., defined by eight corner nodes) may be indexed at its shallowest lower left corner and the number of grid cells may be a product of the model's i, j and k dimensions. In such an example, each grid cell may be defined by its eight nodes, which may be labeled according to height and compass directions (e.g., basesouthwest, topsouthwest, basenorthwest, topnorthwest, etc.). Pillar grids can model, for example, faults (e.g., a surface that cuts a pillar grid), horizons (e.g., "k" index), zones (e.g., volume between two horizons), segments (e.g., contiguous block of grid cells bounded by fault planes), etc., and may be used to specify properties (e.g., earth properties).

While an indexical coordinate system is described with respect to a pillar grid, an indexical coordinate system may be used in conjunction with other types of grids. For example, a grid that can define cells may be characterized using indexes such as i, j, and k to represent three spatial dimensions. Such indexes may be capable of representing a grid, for example, in a so-called structured manner (e.g., in contrast to an unstructured manner). As an example, a structured grid may facilitate various types of operations such as those related to matrices, for example, where nearest neighbors may form clusters or bands within a matrix. In turn, a matrix may be handled using a banded solver or other suitable technique. As to a solver for an unstructured grid, as an example, it may rely on input of connectivity information that specifies how grid nodes relate to individual cells. In such an example, a matrix that may not be readily amenable to a banded or other matrix handling technique, which, in turn, can increase computational resource demands, computation time, etc.

As an example, a structured grid that includes a natural (i, j, k) indexing system can improve storage and, for example, facilitate identification of topological neighbors where cell index and connectivity might not be stored in memory and can be deduced from ordering of records/entries in memory. In such an example, storing a structured grid can use less memory than, for example, storing an unstructured grid of similar size. Further, as an example, for construction of large systems of equations (e.g., independently from their resolution), which may involve repeatedly iterating over topological neighbors of a given grid cell, such an approach may be, for example, about an order of magnitude faster when compared to use of an unstructured grid. As an example, a method that can generate a structured grid may provide compatibility with one or more frameworks (e.g., whether current, legacy, etc.).

As mentioned, where a sedimentary basin (e.g., subsurface region) includes various types of features (e.g., stratigraphic layers, faults, etc.), nodes, cells, etc. of a grid may represent, or be assigned to, such features. In turn, discretized equations may better represent the sedimentary basin and its features. As an example, a structured grid that can represent a sedimentary basin and its features, when compared to an unstructured grid, may allow for more simulations runs, more model complexity, less computational resource demands, less computation time, etc.

As an example, a grid may conform to structural features such as, for example, Y-faults, X-faults, low-angle unconformities, salt bodies, intrusions, etc. (e.g., geological discontinuities), to more fully capture complexity of a geological model. As an example, a grid may optionally conform to stratigraphy (e.g., in addition to one or more geological discontinuities). As to geological discontinuities, these may include model discontinuities such as one or more model boundaries. As an example, a grid may be populated with property fields generated, for example, by geostatistical methods.

As an example, a discontinuity may be discerned via seismology where, for example, a subsurface boundary or interface exists at which a physical quantity, such as the velocity of transmission of seismic waves, changes abruptly. For example, the velocity of P-waves increases from about 6.5 km/s to about 8 km/s at the Mohorovicic discontinuity between the Earth's crust and mantle.

Seismic interpretation is a process that involves examining seismic data (e.g., with respect to location and time or depth) to identify one or more types of subsurface structures (e.g., horizons, faults, geobodies, etc.). An interpretation process may consider vertical seismic sections, inline and crossline directions, horizontal seismic sections called horizontal time slices, etc. Seismic data may optionally be interpreted with other data such as, for example, well log data.

As an example, seismic interpretation may be performed using seismic to simulation software such as the PETREL® seismic to simulation software framework (Schlumberger Limited, Houston, Tex.), which includes various features, for example, to perform attribute analyses (e.g., with respect to a 3D seismic cube, a 2D seismic line, etc.), to analyze other data, to build models, etc. While the PETREL® seismic to simulation software framework is mentioned, other types of software, frameworks, etc., may be employed.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston Tex.), the INTERSECT® reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
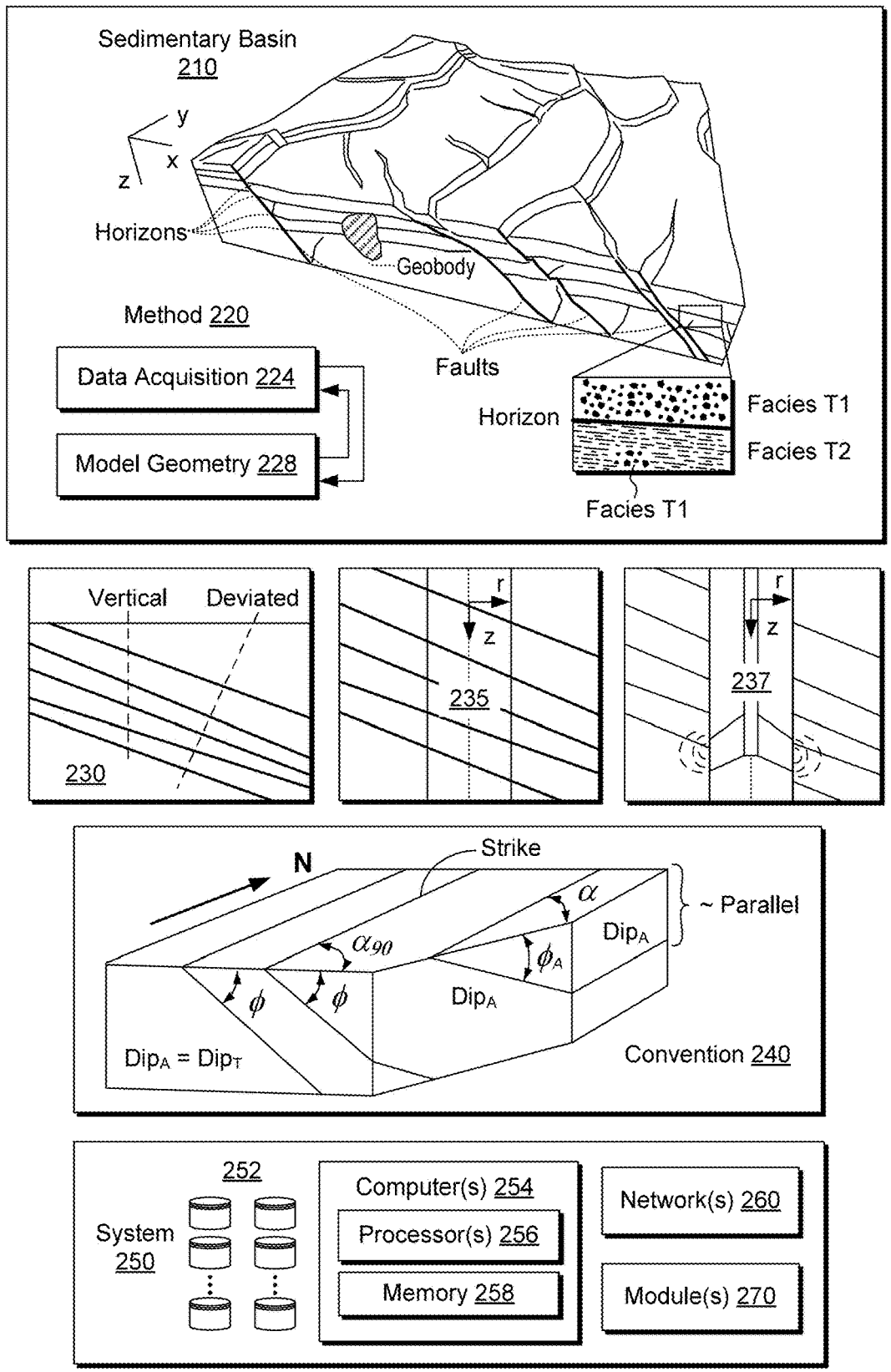
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

Figure 3:
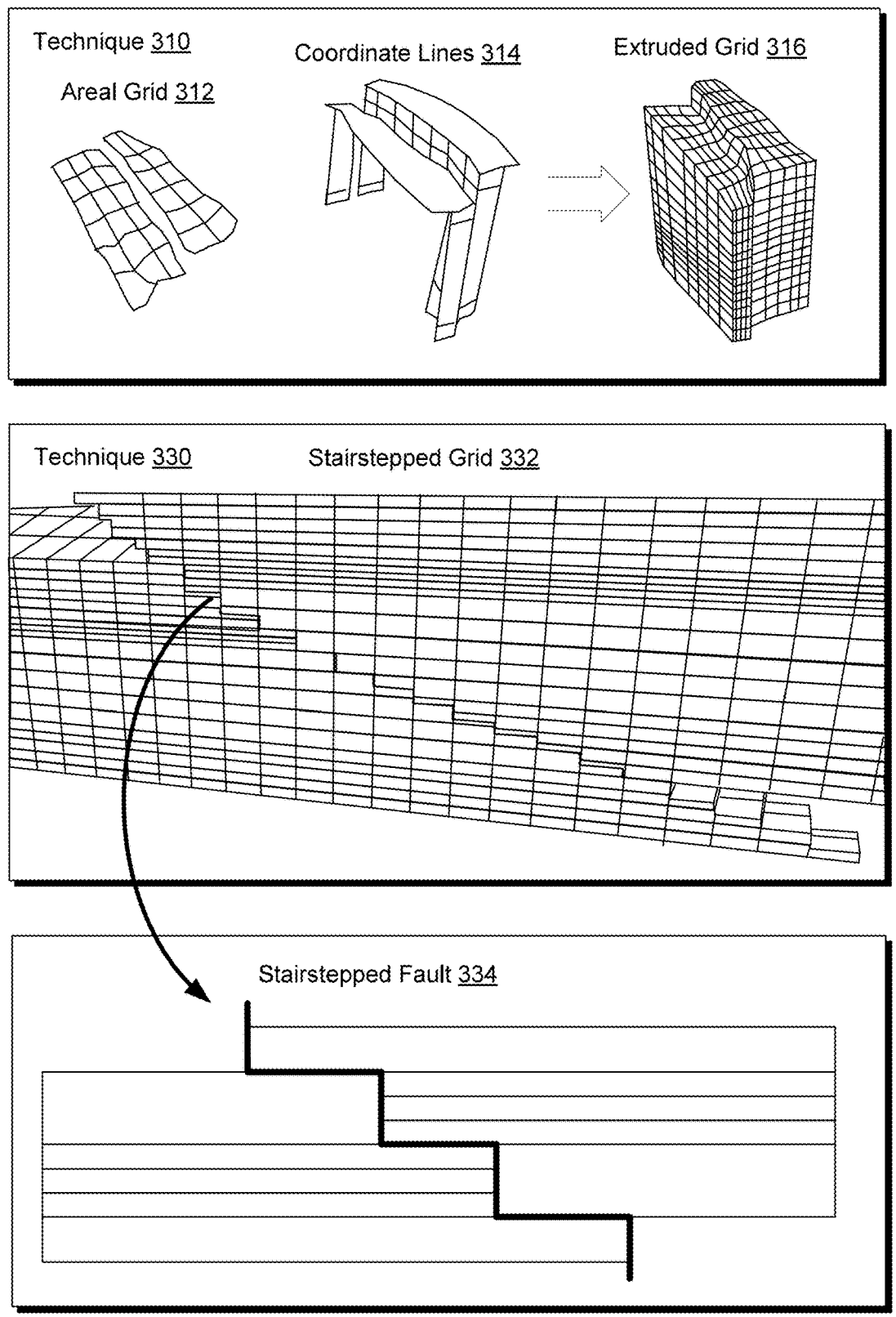
FIG. 3 illustrates examples of techniques, an example of a stairstepped grid and an example of a stairstepped representation of a fault.

FIG. 3 shows examples of techniques for handling faults. In particular, a technique 310 and/or a technique 330 can be used for creating faulted structured grids that aim to conform to geological horizons.

As to the technique 310, it is based on the extrusion of a surface grid. For example, a topological areal grid 312 conforming to and cut by a fault of a fault network is built and some coordinate lines 314 are provided. Given the grid 312 and the coordinate lines 314, a 3D grid 316 is created by an extrusion process that may include duplicating multiple times the base grid and adapting it to the horizon geometry, along linear or curved coordinate lines which trajectory is computed in such a way it does not cross the fault network.

The technique 310 can give rise to some issues, for example, it may not be possible to design coordinate lines that run from the base to the top of the grid without crossing any fault and it may not allow efficient minimization of distortion of grid cells (e.g., distortion being defined as a measure of the distance to purely orthogonal geometries).

As to the technique 330, it includes creating first a 3D (e.g., unfaulted) grid that conforms to horizon surfaces and then, for example, rasterizing faults within the grid. In such an example, the action of rasterizing can corresponds to finding the set of cell facets that correspond the best to the fault surfaces and "unsewing" (e.g., unstitching) the grid along these facets. Such a rasterization process involves computing a set of edges of a topological dual of the grid that are intersected by an object(s) to be rasterized, which, in the example of FIG. 3, is a fault, as shown in a side view of a 3D grid 332 and in an enlarged simplified side view 334.

The technique 330 can give rise to some issues. For example, the grid facets representing the faults may poorly approximate the geometry of the initial fault surfaces. And, such a rasterization operation may involve creating a stairstepped (or zig-zag) representation of the fault surfaces (see, e.g., 334). Consequences of stairstepped geometry may be germane to petrophysical properties—potentially affecting flow simulations—as may be associated with fault surfaces (e.g., such as those related to fault permeability) and to situations where wells are crossing faults because location of the intersections with the faults are represented with some level of inaccuracy.

Rasterization, as applied to a grid, may subject grid geometry to one or more constraints. For example, consider a desire to maintain matching stairsteps on both sides of a fault (e.g., to avoid gaps, overlaps, etc.) and another desire to maintain layering of a grid that follows geological surfaces (e.g., per seismic or well data). As fault displacement may create an offset between both sides of the fault that does not correspond to an integer number of cells in a vertical direction of a grid (e.g., k index, time, or depth), distortions may occur in the neighborhood of a fault (e.g., by stretching, squeezing or merging grid cells vertically, moving horizons artificially, or both).

Figure 4:
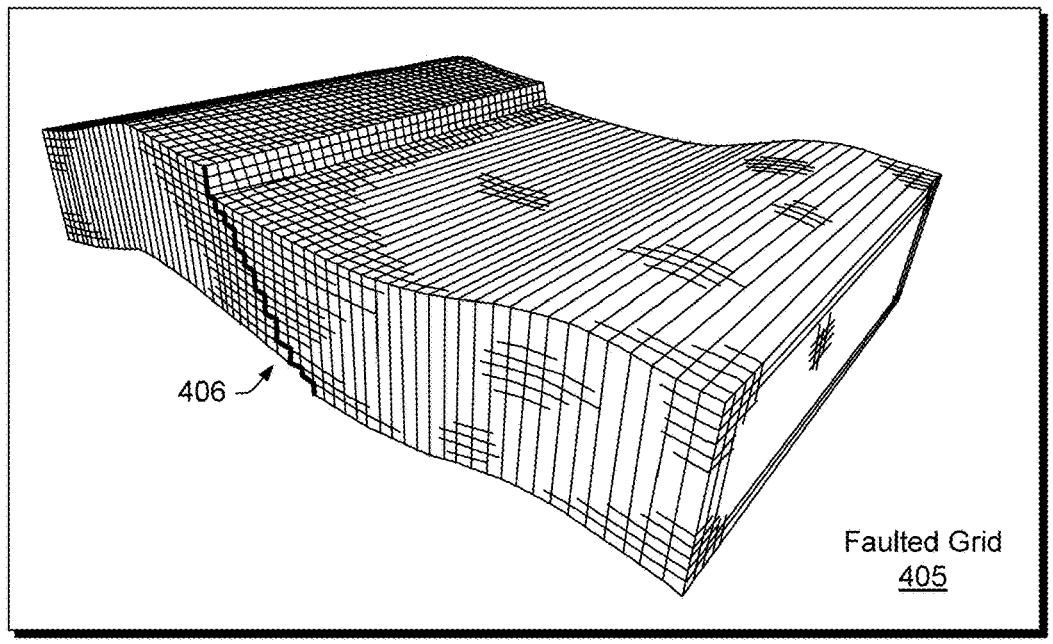
FIG. 4 illustrates an example of a geologic model and an example of a portion of the model.
Figure 4:
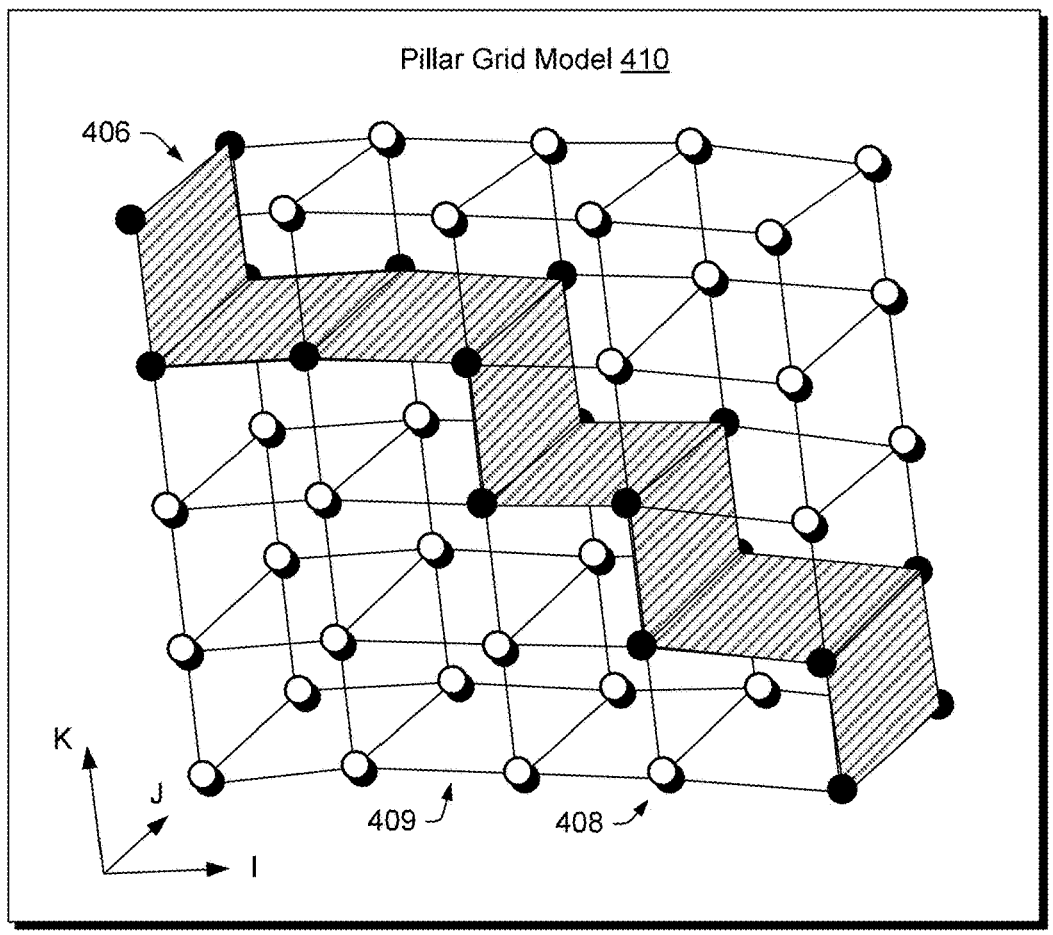

FIG. 4 shows an example of a faulted grid 405 that includes a stairstepped portion that represents a fault 406 in a geologic environment. FIG. 4 also shows an example of a portion of a pillar grid model 410 that includes nodes 408 and connections 409 where connections along the K index of an I, J, K index reference system can correspond to pillars. As shown, the pillar grid model 410 includes a stairstepped representation of the fault 406; whereas, in an actual geologic environment, a fault is unlikely to be spatially stairstepped in a manner that corresponds to a pillar grid, particularly given resolution of a pillar grid. As an example, the pillar grid model 410 may provide for representations of horizons where one or more horizons may be shifted in part in a direction of the K index such that on one side of the stairstepped representation of the fault 406, a horizon has a first K index and on the other side of the stairstepped representation of the fault 406, the same horizon has a second, different K index. In other words, faulting may a shift horizon such that a horizon is discontinuous across a fault.

Figure 5:
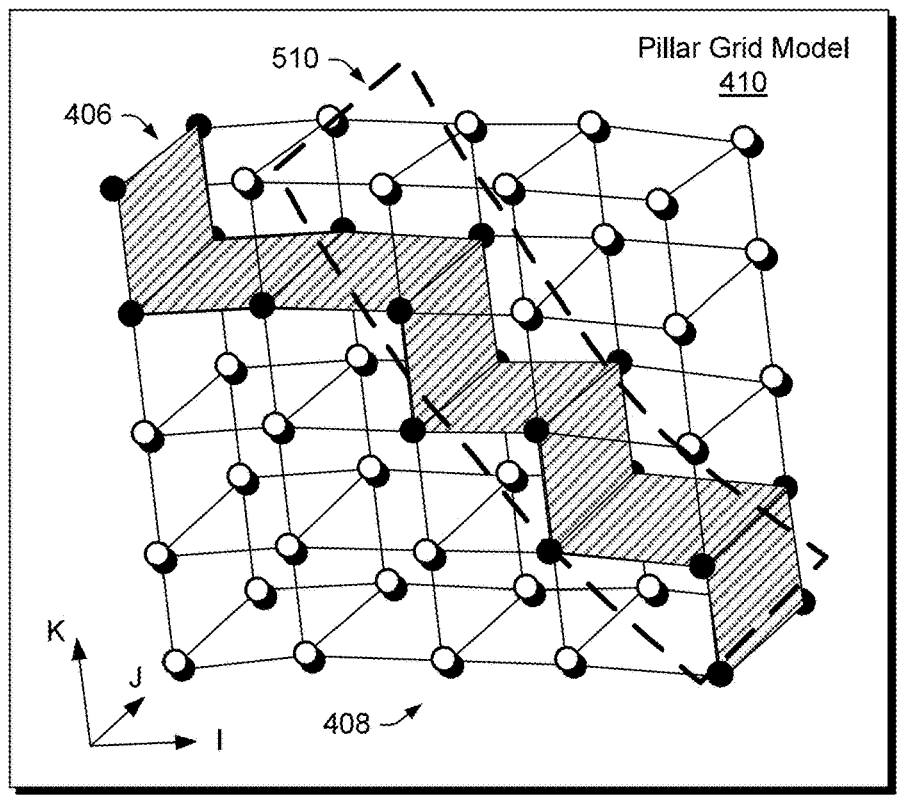
FIG. 5 illustrates an example of a grid model with respect to a surface and an example of a projection technique.
Figure 5:
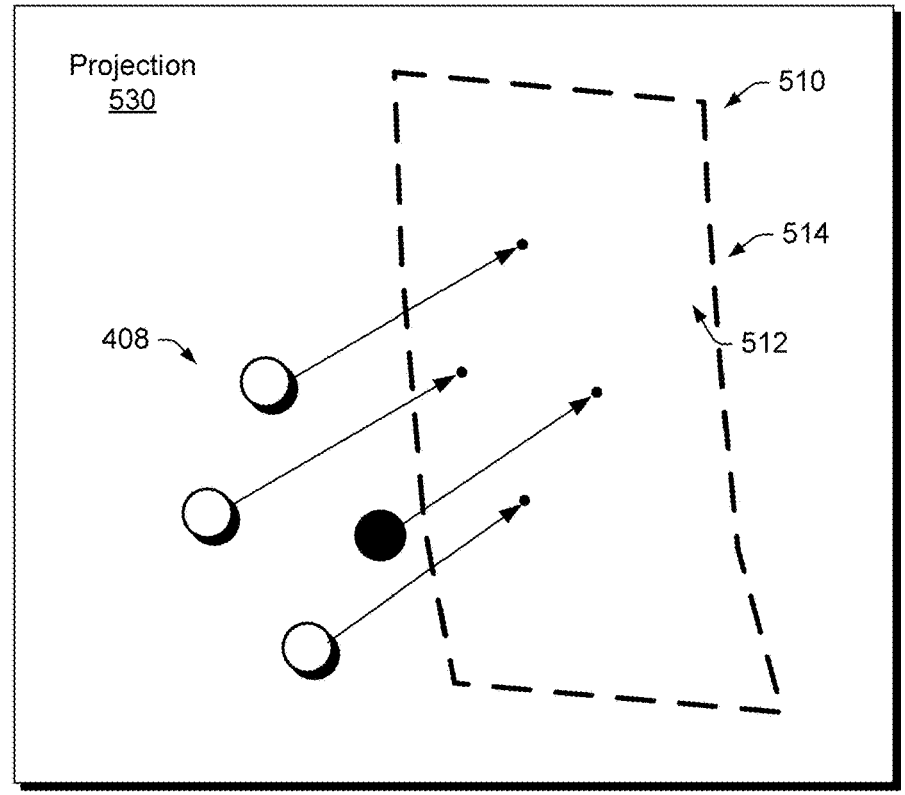

FIG. 5 shows the pillar grid model 410 of FIG. 4 as including a fault surface 510, which may be a physically more accurate representation (e.g., more realistic) when compared to the stairstepped representation of the fault 406. Or, in other words, the stairstepped representation of the fault 406 may be an approximation of the fault surface 510 in a discretized space defined by orthogonal coordinates (e.g., I, J and K index direction). As an example, a fault may be planar and may dip at an angle that is offset from one or more of the indexes I, J and K. As such, a fault may not be positioned or aligned with one or more coordinate system directions, again, which can be a reason for approximating a fault via stairstepping.

Stairstepping can be employed to maintain grid characteristics. For example, it may be desirable to maintain grid cell shapes for purposes of computations such as, for example, to aid in one or more of numerical stability in iterative solution techniques, array handling, etc. As an example, stairstepping may be employed to facilitate use of indexing such as, for example, the I, J and K indexing shown in FIG. 5, which may carry over to arrays in a numerical solver that solves systems of equations defined spatially with respect to a pillar grid model. However, as a fault in nature may differ spatially from a stairstepped representation thereof in a pillar grid model, a system of equations when solved for a stairstepped representation of a fault may provide a solution (e.g., as to pressure, flow, etc.) that does not adequately match natural phenomena, particularly near a fault (e.g., or other discontinuity).

As an example, a stairstepped grid can be or include a rectilinear representation of a relatively smoothly varying surface (e.g., a fault form). A method can include constructing a smoothly varying triangulated surface as an approximation of a subterranean structure such as a fault as also represented by a stairstepped grid.

As an example, a fault may be represented as a triangulated surface or other discretized surface. As an example, properties can be assigned to a stairstepped grid (e.g., from a stratigraphic model; a layered model). In such an example, layering information (e.g., properties in space) can be projected into a geological space fault surface. As an example, properties associated with a grid (e.g., assigned to a grid) may be sensible and a stairstepped representation of a fault may be less sensible. Such properties may be adjusted by projecting a portion of the grid (e.g., including a stairstepped portion) onto a more sensible representation of the fault.

As an example, properties may be mapped with respect to a surface that represents a fault. Such an approach may be based at least in part on a priori knowledge of what type of rock may be expected on one side and another side of the fault.

As an example, a method that includes adjustment of properties may enhance simulation of flow that may occur across a structure such as a fault. As an example, such an approach may enhance estimates of fault throw and, for example, estimates of clay content on a fault. Such an approach may enhance estimates of transmissibility and, hence, how fluid may flow in the presence of the fault (e.g., flow across faults, etc.). As an example, properties may be associated with one or more of nodes, cells, and faces. As an example, a cell-centered approach may be utilized for at least some properties. As an example, properties may be assigned to one or more faces such as, for example, one or more faces of a cell that represent a fault and/or a fault interface.

As an example, a stairstepped grid that represents a fault can include substantially horizontal portions and substantially vertical portions. In such an example, the portions may be overly long and/or overly short when compared to how properties would be if a smoother representation of the fault was utilized. For example, consider a 0 degrees portion of a step and a 90 degree portion of a step. These portions include associated lengths where, for example, a sum of their lengths can exceed a corresponding length of a fault. In such an example, mathematically, properties associated with such lengths can impact a simulation. For example, a property may be "over-represented" as a length of a tread or a riser of a stairstepped grid representation of a fault is longer than a length of a smoother representation of the fault. As an example, a method may geometrically account for such disparities and adjust properties accordingly (e.g., to achieve a more "balanced" and realistic application of properties).

As an example, a method can include adjusting one or more properties with respect to grid-based distortions at or proximate to a fault, as modeled at least in part via stairstepping (e.g., where spatial discrepancies exist between spatial data for a fault and a stairstepped representation of the fault).

FIG. 5 also shows a projection technique 530 where a plurality of nodes 408 are projected onto a side 512 of the surface 510, noting that such a technique may also project a plurality of nodes onto another side 514 of the surface 510. As mentioned, rock and associated properties may differ with respect to a fault. For example, where a horizon has shifted with respect to a fault, properties associated with the horizon (e.g., rock defining the horizon, adjacent to the horizon, etc.) may differ on different, opposing sides of the fault.

As an example, a projection technique may include one or more parameters. For example, consider one or more of a distance parameter, an angle parameter, etc. A distance parameter may be used to determine whether a node is to be projected while an angle parameter may determine a projection angle (e.g., or angles). As an example, a projection may project along a direction of a coordinate system. As an example, a projection may project at an angle to a direction of a coordinate system. As an example, a projection may project in a manner such that a line between a node and a surface representing a discontinuity such as a fault meets the surface as a normal of the surface (e.g., as a normal vector). As an example, one or more projection parameters on one side of a discontinuity may differ from one or more projection parameters on another side of the discontinuity. As an example, a projection technique may be referred to as a mapping technique, for example, where information is mapped from a grid onto a surface and/or vice versa.

Figure 6:
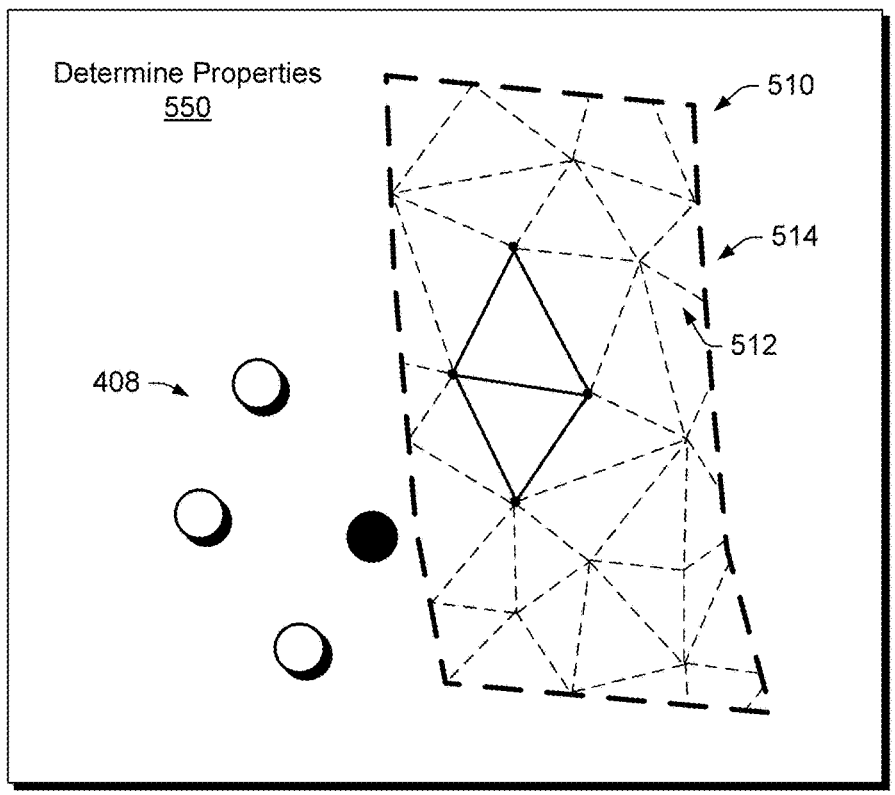
FIG. 6 illustrates examples of a determination technique and an adjustment technique.
Figure 6:
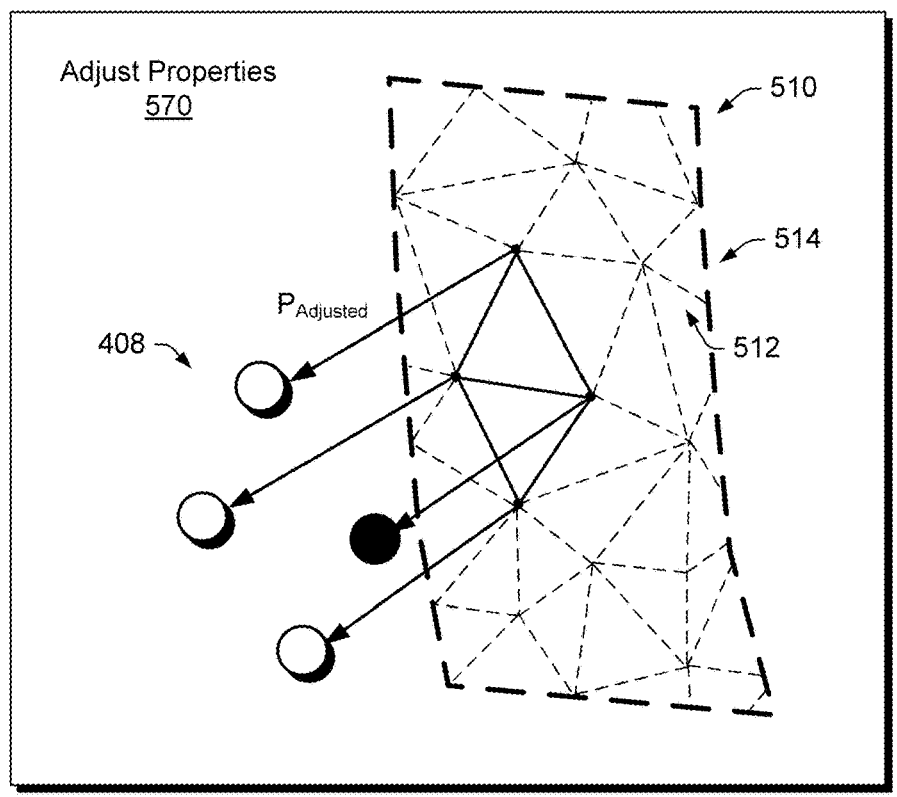

FIG. 6 shows an example of a determination technique 550 for determining properties and an example of an adjustment technique 570 for adjusting properties associated with one or more nodes (e.g., which may define a cell or cells). As an example, where one or more properties are assigned to a cell (e.g., considered a cell-centered approach, etc.), one or more adjusted properties may be assigned to a cell optionally based at least in part on projection of nodes that define at least a portion of the cell.

FIG. 6 shows the side 512 of the surface 510 as being triangulated or otherwise discretized into polygons, etc. As an example, the surface 510 may be a pseudo-geological form, optionally based on information such as, for example, one or more of seismic data, wellbore data, surface imagery, etc.

As an example, the techniques shown in FIG. 6 may provide for enhancing how a grid model represents a geological form such as, for example, a fault or other type of discontinuity (e.g., which may be represented via stair steps in the grid model). As an example, a method can include mapping of stairstepped grid information to a surface that represents a discontinuity where such mapping can include generating a map. For example, consider a map that includes information as to spatial discrepancies between a stairstepped representation of a discontinuity and a surface that more accurately represents the discontinuity. In such an example, the information may be utilized to adjust one or more properties and/or one or more connectivities associated with the stairstepped grid where the stairstepped grid can be part of a model suitable for input to a simulator such as, for example, a flow simulator. As an example, mapping can include projecting. As an example, projecting can include projecting a surface to a stairstepped grid or vice-versa.

As an example, a method can include receiving two forms of a subterranean structure. For example, a method can include receiving a stairstepped form of a subterranean structure and a smoother form of the subterranean structure.

In such an example, the method can include mapping information from one form to another. For example, a method can include mapping information from a stairstepped form to a smoother form and, for example, mapping information from the smoother form back to the stairstepped form. In such an example, the information may be adjusted through use of the smoothed form to account for a lack of physical accuracy of the stairstepped form. As an example, adjustments may be based in geometry. For example, geometry of a smoothed form of a subterranean structure may be more accurate than geometry of a stairstepped form of the subterranean structure. As an example, properties may be geometrically adjusted to more accurately represent an actual form of a subterranean structure.

As an example, projected nodes can be used to define a triangulated surface. For example, in FIG. 6, the triangulations of the side 512 of the surface 510 can be formed at least in part by projection of a plurality of nodes of a grid onto the side 512 of the surface 510. As an example, given a triangulated surface such as the side 512 of the surface 510, a method can include calculating information such as, for example, fault permeability and/or thickness. As an example, a method can include projecting (e.g., mapping) such information back to nodes and, for example, performing transmissibility calculations. In such an example, the transmissibility calculations can be based at least in part on a projection technique and a surface that represents a subterranean structure. Transmissibility calculations can be performed in a stairstepped space where the stairstepped space is utilized for simulating fluid flow (e.g., fluid flow simulation takes place in a grid space that includes a stairstepped representation of a geologic structure).

As an example, a modeling and/or simulation approach may include permeability information where permeability defines an ability to allow flow to occur at one or more points. As an example, a modeling and/or simulation approach may include transmissibility information where transmissibility defines an ability to allow flow between points. As an example, a simulation can take into account length and cross sectional areas of a permeability distribution. As an example, a simulator can include computing transmissibility between various cell centers of cells defined by a grid and include modifying transmissibility values at least in part based on transmissibility effects of one or more faults represented as one or more modifiers at one or more grid cell boundaries.

As an example, transmissibility in an X-direction may be calculated using an equation such as:

$$TRANX_i = (CDARCY * TMLTX_i * A * DIPC)/B$$

where $TRANX_i$ is the transmissibility between cell i and cell j, its neighbor in the positive X-direction; CDARCY is Darcy's constant=0.00852702 (Metric units); and $TMLTX_i$ is the transmissibility multiplier for cell i.

As to A, it represents an interface area between cells i and j, for example, as follows:

$$A = DX_j * DY_i * DZ_i * RNTG_i + DX_i * DY_j * DZ_j * RNTG_j)/(DX_i + DX_j)$$

where DX, DY and DZ are dimensions of a cell; RNTG is a net to gross ratio.

As to B, it represents a function of permeability in cell i and cell j, for example, as follows:

$$B = ((DX_i/PERMX_i) + (DX_j/PERMX_j))/2$$

As to DIPC, it represents a dip adjustment, which may be expressed as:

$$DIPC = DHS/(DHS + DVS)$$

$$DHS = ((DX_i + DX_j)/2)^2$$

$$DVS = (DEPTH_i - DEPTH_j)^2$$

As an example, a method can include adjusting one or more properties associated with transmissibility. As an example, a method can include adjusting transmissibility. As an example, a method can include adjusting a transmissibility multiplier.

As an example, a stairstepped grid may exist with a formation or formations. As an example, consider the Ness Formation of the Brent Field. The Ness Formation measures up to about 160 m thick and includes various facies associations that form reservoir-quality rock (e.g., varied channel sandstones, fluvial sheet sandstones, major mouth bars, lagoonal shoals and lagoonal sheet sandstones). Such associations make up about 50 percent to about 60 percent of the sand-rich sequence and are embedded in non-reservoir facies associations (e.g., lagoonal mudstones, emergent flood-plain mudstones and allochthonous and autochthonous coals). Within the amplified Ness Formation, environments of interest include lagoonal deltas, being wave and fluvial dominated with minor tidal influence where sand bodies have been produced by such deltas.

Sand-body geometries can be quite variable, reflecting both localized controls on sediment distribution, particularly immediately above compacting shoreface pile, and more regional effects including coarse-sediment supply, basinal processes and fault-block subsidence. Dominant controls on sedimentation have resulted in regular drowning events on the delta plains, which have had an impact by producing a strongly layered reservoir.

The Ness Formation is characterized by frequent alteration between thin reservoir units (e.g., about 1 m to about 20 m thick), and thin shale and coal benches that constitute vertical flooding and pressure barriers. In such a formation, there can be variations in sand permeability whereas some of the sands may have good reservoir properties and large lateral extents. In such a formation, heterogeneous characteristics and the presence of faults can lead to a complex communication pattern, for example, internally and with one or more other reservoirs.

As an example, where a fault exists in a formation that includes various types of rock, a stairstepped approximation as to properties of the rock, particularly with respect to sides of a fault, may be lacking and impact simulation. As an example, a method can include mapping a stairstepped representation of a fault to a surface that is a smoother representation of the fault and adjusting one or more of properties, connectivities, etc. associated with the stairstepped representation. In such an example, flow simulation may be enhanced, for example, via more accurate representation of physical properties, connections, etc.

As an example, a method can include one or more of validating and calibrating with respect to projections of nodes to a surface. As an example, a method can include building one or more models using gridding techniques with smooth fault surfaces (e.g., assumed accurate representations) and comparing calculations performed therewith to calculations for a model or models with a stairstepped fault. In such an approach, validating and/or calibrating may be performed on a representative portion of a geologic environment and/or, for example, on a "worst" case portion (e.g., where stairstepping may be prevalent with many steps, steep steps, etc.).

As an example, in a stairstep fault representation, connecting up layers across the fault may give rise to some inaccuracies as these may not necessarily be connected in a more accurate representation of the fault. Without adjustment to a stairstep calculation (e.g., via creating a smoothed surface, calculating properties on the smoothed surface, and mapping the results back to a stairstep geometry), substantial differences in the cross-fault flow patterns may be expected, for example, due to false cross-fault cell connections.

As an example, a method can include adjustments as to a calculation for thickness. For example, consider a scenario where thickness of fault rock represented in a stairstepped grid may not be readily mapped from a property calculated on a smoothed geological surface as volumes of fault rock may be inconsistent between the two geometries.

Figure 7:
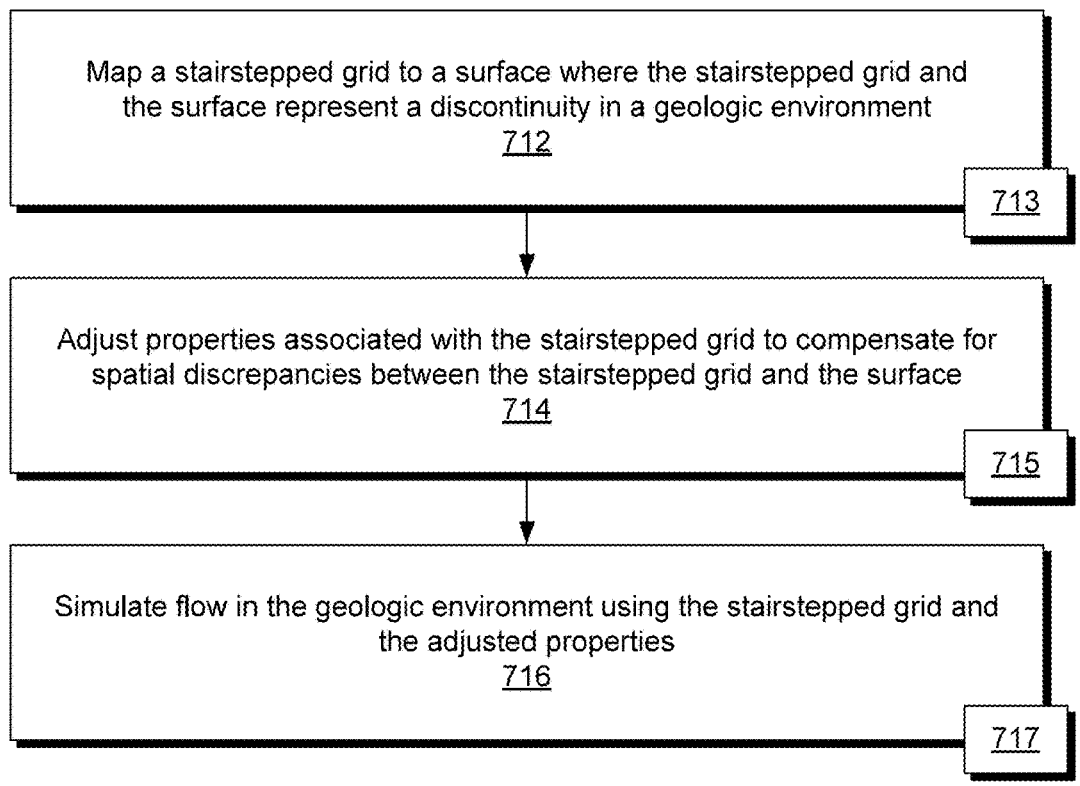
FIG. 7 illustrates examples of methods.
Figure 7:
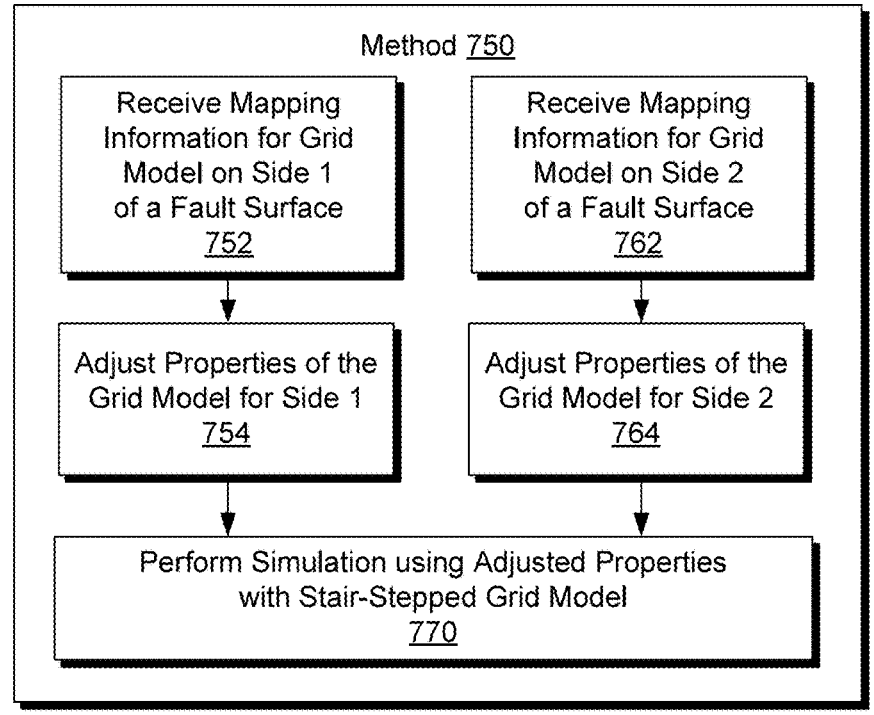

FIG. 7 shows an example of a method 710 and an example of a method 750. As to the method 710, it includes a map block 712 for mapping a stairstepped grid to a surface where the stairstepped grid and the surface represent a discontinuity in a geologic environment; an adjustment block 714 for, based at least in part on mapping, adjusting properties associated with the stairstepped grid to compensate for spatial discrepancies between the stairstepped grid and the surface; and a simulation block 716 for simulating flow in the geologic environment using the stairstepped grid and the adjusted properties.

The method 710 is shown in FIG. 7 in association with various computer-readable media (CRM) blocks 713, 715 and 717 (e.g., or modules). Such blocks generally include instructions suitable for execution by one or more processors (or cores) to instruct a computing device or system to perform one or more actions. While various blocks are shown, a single medium may be configured with instructions to allow for, at least in part, performance of various actions of the method 700. As an example, the one or more blocks 713, 715 and 717 may be modules such as, for example, one or more of the modules 270 of the system 250 of FIG. 2.

As shown in FIG. 7, the method 750 can include one or more portions, which may be referred to as a Side 1 portion and a Side 2 portion. In such an example, the method 750 may be performed in a serial manner and/or in a parallel manner.

As shown in the example of FIG. 7, the method 750 includes a reception block 752 for receiving projection information for a grid model on Side 1 of a fault surface, an adjustment block 754 for adjusting properties of the grid model for Side 1, and a performance block 770 for performing a simulation using the adjusted properties with a stairstepped grid model.

As shown in the example of FIG. 7, the method 750 includes a reception block 762 for receiving projection information for a grid model on Side 2 of a fault surface, an adjustment block 764 for adjusting properties of the grid model for Side 2, and the performance block 770 for performing a simulation using the adjusted properties with a stairstepped grid model.

As an example, the performance block 770 may be implemented after Side 1 and Side 2 properties have been adjusted. In such an example, the performance block 770 may include calculating transmissibilities with respect to adjusted properties.

Figure 8:
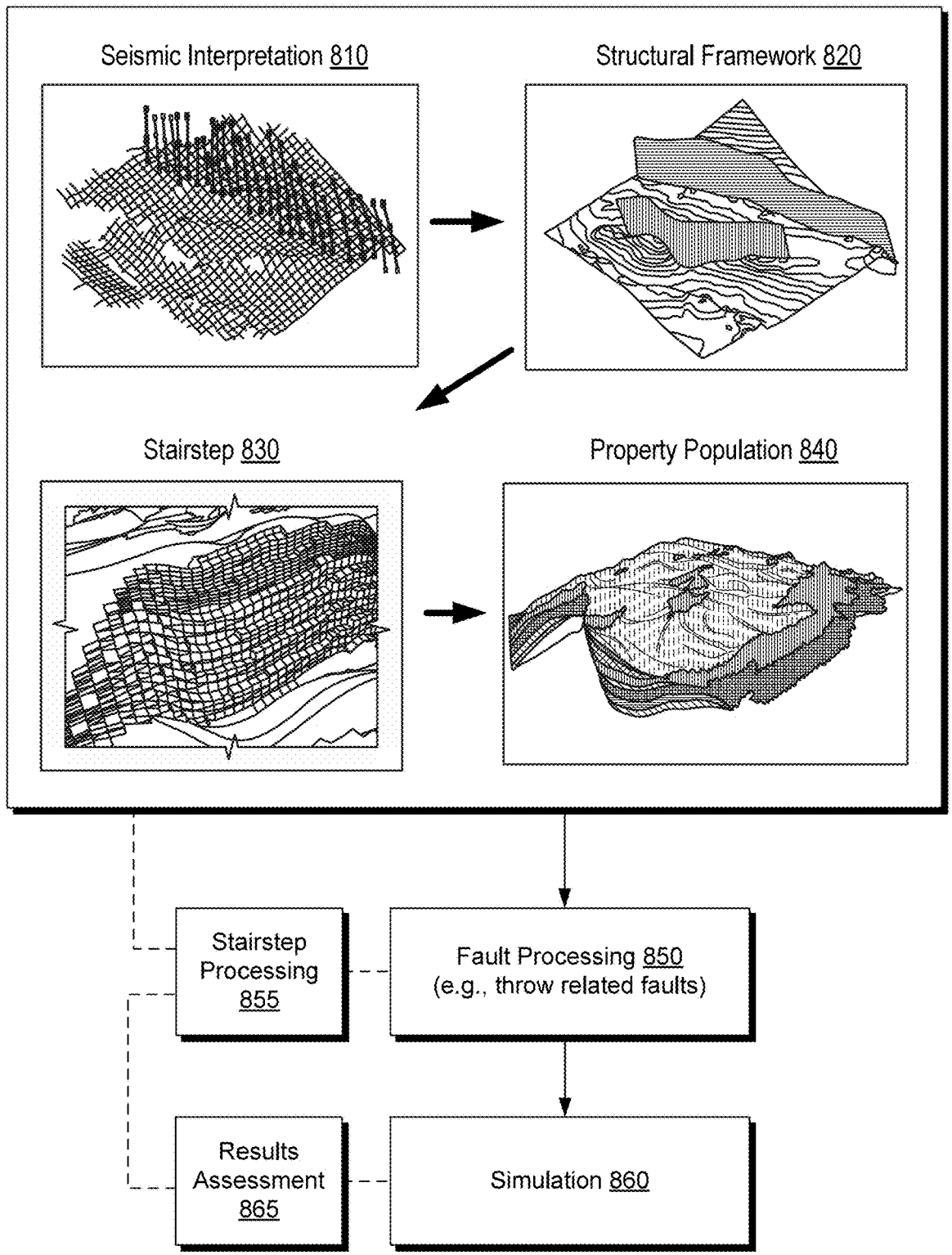
FIG. 8 illustrates an example of a method.

FIG. 8 shows an example of a method 800 that includes a seismic interpretation block 810 for performing a seismic interpretation and generating information (e.g., locations of structures, etc.), a structural framework block 820 for generating one or more structures (e.g., structures within a pillar grid model, etc.), a stairstep block 830 for generating a stairstepped representation of at least a portion of a structure (e.g., for at least a portion of a fault, etc.), and a property population block 840 for populating a model with properties (e.g., assigning properties to at least some cells of a grid cell model, which may be a pillar grid model, etc.).

In the example of FIG. 8, the method 800 can include a fault processing block 850 for processing one or more faults (e.g., at least a portion of at least one fault, etc.). As an example, the block 850 may include stairstep processing per a stairstep processing block 855. In such an example, a cycle may be established to iteratively adjust one or more portions of a stairstep representation of at least a portion of a fault.

In the example of FIG. 8, the method 800 can include a simulation block 860 for simulating one or more phenomena associated with a geologic environment. For example, a geologic environment may include a fault where a model represents at least a portion of the fault using a stairstepped representation (e.g., a stairstepped grid region of a grid cell model). As shown in FIG. 8, an assessment block 865 may be provided for assessing results of a simulation and, for example, based at least in part on an assessment performing stairstep processing, for example, per the stairstep processing block 855. As an example, a stairstepped representation of at least a portion of a fault may be adjusted via a results assessment that may assess simulation results (e.g., from a reservoir simulator and/or another type of simulator, etc.).

As an example, a method may provide fault properties that can support one or more stairstep grids going to a simulator. As an example, a workflow may commence with modelling and include simulating and optionally adjusting a model based at least in part on such simulating. As an example, consider a framework such as the framework 170 of FIG. 1 where modules are included to perform seismic interpretation, to generate a structural framework (e.g., a structural grid) and to call for simulation of physical phenomena associated with a geologic environment based at least in part on the structural framework. As an example, a workflow may include simulating a structurally complex model using a reservoir simulator (e.g., the ECLIPSE® simulator, etc.). As an example, a module can include features for adjusting one or more stairstep geometries (e.g., of a stairstepped region), for example, for purposes of providing a grid model that can be used to support simulation of physical phenomena.

Figure 9:
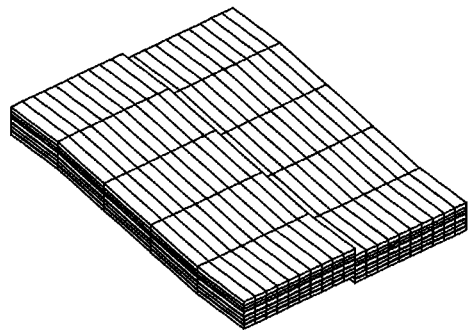
FIG. 9 illustrates an example of a method.
Figure 9:
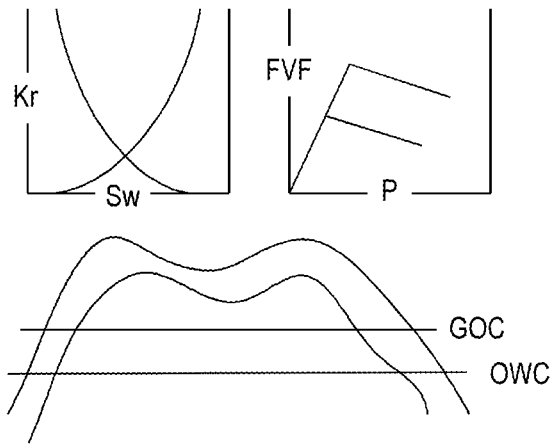
Figure 9:
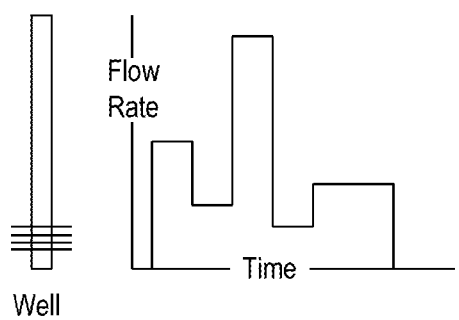

FIG. 9 shows an example of a method 910 that includes a calculation block 920 for calculating pore volumes, transmissibilities, depths and NNCs, an initialization and calculation block 940 for initializing and calculating initial saturations, pressure and fluids in place, and a definition and time progression block 960 for defining one or more wells and surface facilities and advancing through time, for example, via material balances for individual cells (e.g., with the one or more wells as individual sinks and/or sources). In such an example, the block 920 may include one or more modules for generating, adjusting, etc. one or more stairstepped grids, which may represent one or more faults, a portion of a fault, etc.

As to the initialization and calculation block 940, for an initial time (e.g., t0), saturation distribution within a grid model of a geologic environment and pressure distribution within the grid model of the geologic environment may be set to represent an equilibrium state (e.g., a static state or "no-flow" state), for example, with respect to gravity. As an example, to approximate the equilibrium state, calculations can be performed. As an example, such calculations may be performed by one or more modules. For example, one or more of a seismic-to-simulation framework, a reservoir simulator, a specialized module, etc. may be implemented to perform one or more calculations that may aim to approximate or to facilitate approximation of an equilibrium state. As an example, a reservoir simulator may include a module for initialization using data to compute capillary and fluid gradients, and hence fluid saturation densities in individual cells of a grid model that represents a geologic environment.

As mentioned, an initialized grid cell model may not be in an equilibrium state. Thus, a module may be executed using a computing device, a computing system, etc. that acts to adjust an initialized grid cell model to approximate an equilibrium state. Given a certain saturation field for a grid cell model, a technique may adjust relative permeability end points (e.g., critical saturations) such that relevant fluids are just barely immobile at their calculated or otherwise defined initial saturations. As a result, the grid cell model, as initialized, may represent a quiescent state in the sense that no flow will occur if a simulation is started without application of some type of "force" (e.g., injection, production, etc.).

As an example, a reservoir simulator may advance in time. As an example, a numeric solver may be implemented that can generate a solution for individual time increments (e.g., points in time). As an example, a solver may implement an implicit solution scheme and/or an explicit solution scheme, noting that an implicit solution scheme may allow for larger time increments than an explicit scheme. Times at which a solution is desired may be set forth in a "schedule". For example, a schedule may include smaller time increments for an earlier period of time followed by larger time increments.

A solver may implement one or more techniques to help assure stability, convergence, accuracy, etc. For example, when advancing a solution in time, a solver may implement sub-increments of time, however, an increase in the number of increments can increase computation time. As an example, an adjustable increment size may be used, for example, based on information of one or more previous increments.

As an example, a numeric solver may implement one or more of a finite difference approach, a finite element approach, a finite volume approach, etc. As an example, the ECLIPSE® reservoir simulator can implement central differences for spatial approximation and forward differences in time. As an example, a matrix that represents grid cells and associated equations may be sparse, diagonally banded and blocked as well as include off-diagonal entries.

As an example, a solver may implement an implicit pressure, explicit saturation (IMPES) scheme. Such a scheme may be considered to be an intermediate form of explicit and implicit techniques. In an IMPES scheme, saturations are updated explicitly while pressure is solved implicitly.

As to conservation of mass, values (e.g., for water, gas and oil) in individual cells of a grid cell model may be specified to sum to a certain value, which may be considered a control criterion for mass conservation. As black oil equations tend to be non-linear, a Newton-Raphson type of technique may be implemented, which includes determining derivatives, iterations, etc. For example, a solution may be found by iterating according to the Newton-Raphson scheme where such iterations may be referred to as non-linear iterations, Newton iterations or outer iterations. Where one or more error criteria are fulfilled, the solution procedure has converged, and a converged solution has been found. Thus, within a Newton iteration, a linear problem is solved by performing a number of linear iterations, which may be referred to as inner iterations.

As an example, a solution scheme may be represented by the following pseudo-algorithm:

```
// Pseudo-algorithm for Newton-Raphson for systems
initialize(v);
do {
    //Non-linear iterations
    formulate_non_linear_system(v);
    make_total_differential(v);
    do {
        // Linear iterations:
        update_linear_system_variables(v);
    }
    while((linear_system_has_not_converged(v));
    update_non_linear_system_after_linear_convergence(v);
}
while((non_linear_system_has_not_converged(v))
```

As an example, a solver may perform a number of inner iterations (e.g., linear) and a number of outer iterations (e.g., non-linear). As an example, a number of inner iterations may be of the order of about 10 to about 20 within an outer iteration while a number of outer iterations may be about ten or less for an individual time increment.

As mentioned, a grid may be revised (e.g., adjusted, etc.) based at least in part on simulation results, which may optionally include results such as convergence behavior. For example, where convergence may be possibly improved, one or more adjustments may be made to a grid where such one or more adjustments may allow for convergence, expedite convergence, etc.

Figure 10:
FIG. 10 illustrates geologic structures, an example of a fault pillar grid and an example of a stairstepped grid.
Figure 10:
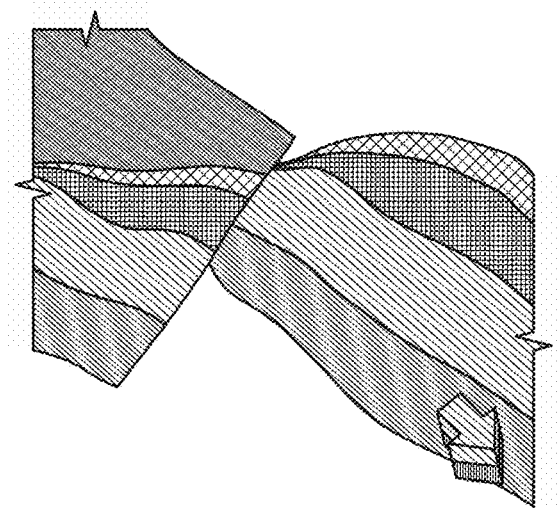
Figure 10:
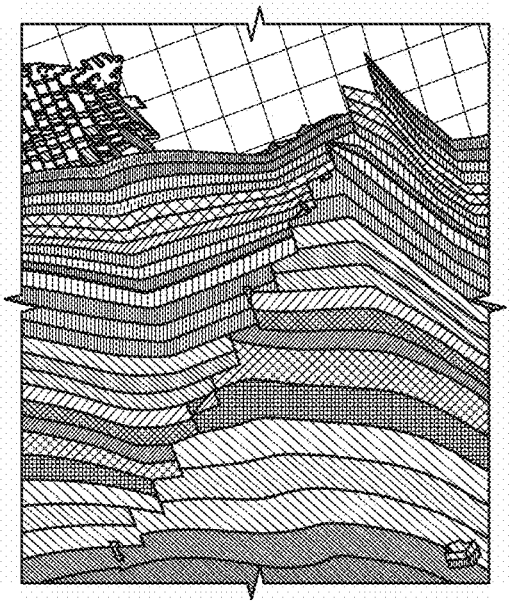

FIG. 10 shows an example of geology 1010 of a geologic environment, an example of layers in a fault pillar grid 1020 and an example of layers in a stairstep grid 1030 (e.g., or stairstepped grid). As an example, a method can include enhancing a model, for example, by estimating fault properties for at least a portion of a grid, which may be a stairstepped portion of a grid. As an example, a method may include processing a stairstepped grid to handle artefacts such as one or more geometry artefacts.

Figure 11:
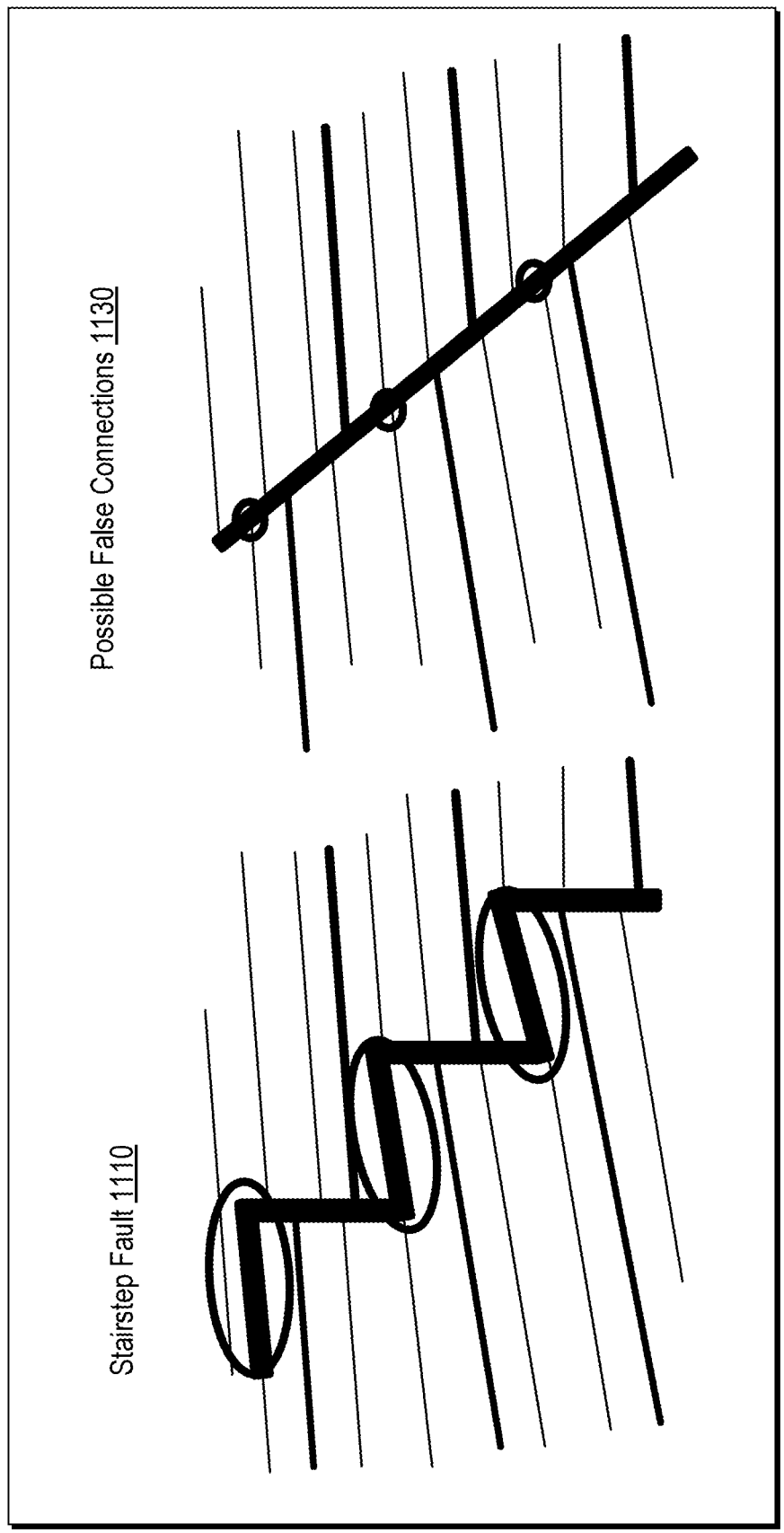
FIG. 11 illustrates an example of a stairstepped representation of a fault and an example of connections.

FIG. 11 shows an example of a stairstep fault 1110 and an example of possible false connections 1130, which may occur in a stairstepped geometry of a fault that includes layers on one side of the fault that may be shifted with respect to layers on another side of the fault.

As an example, a grid process may handle various orientations, for example, orientations as to one or more portions of a grid that may traverse a fault or faults. As an example, a method can include estimating a form of a fault that may be represented via a stairstepped grid region, which may enhance representation of the fault by the stairstepped grid region. As an example, estimating a form may include enhancing one or more of connections, mapping of properties, handling of one or more geometric issues, etc. As an example, a stairstepped grid may be included as part of a pillar grid and may be represented in a manner such that the stairstepped grid "behaves" like a fault pillar grid (e.g., with respect to calculations, properties, connectivity, etc.).

Figure 12:
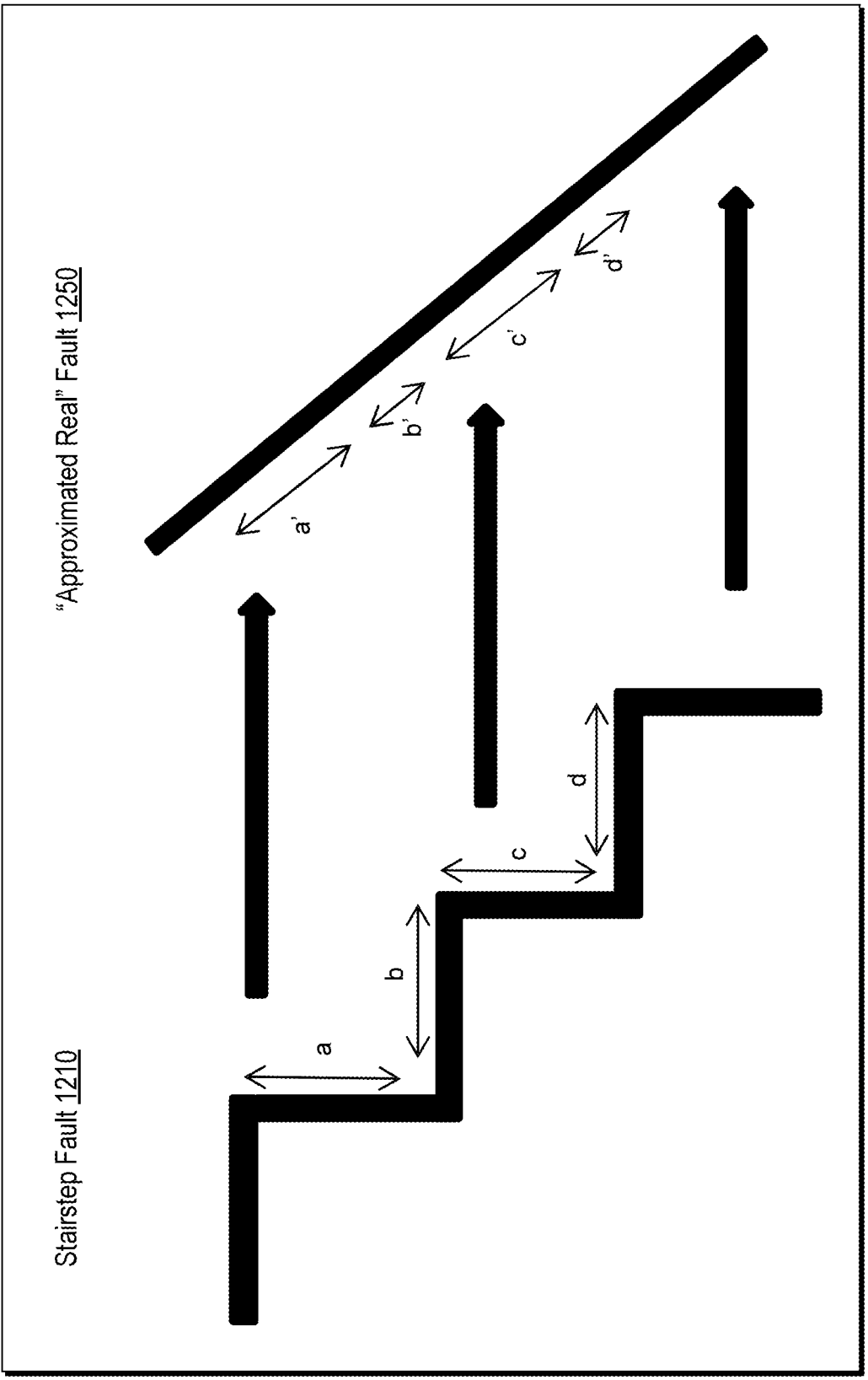
FIG. 12 illustrates an example of a stairstepped representation of a fault and an example of an approximated representation of the fault without stairsteps.

FIG. 12 shows an example of a stairstepped fault 1210 and an "approximated real" fault 1250. As mentioned, a projection or mapping technique may be applied to adjust properties associated with a stairstepped fault, particularly where lengths of treads and risers of "stairs" do not conform to corresponding lengths of a smoother representation of the fault. The example of FIG. 12 shows line lengths that indicate how lengths may differ for two representations (see, e.g., lengths labeled a, b, c and d as well as approximate mapped or projected lengths labeled a', b', c' and d'). As an example, a method can include adjusting one or more properties to account for such length discrepancies.

Figure 13:
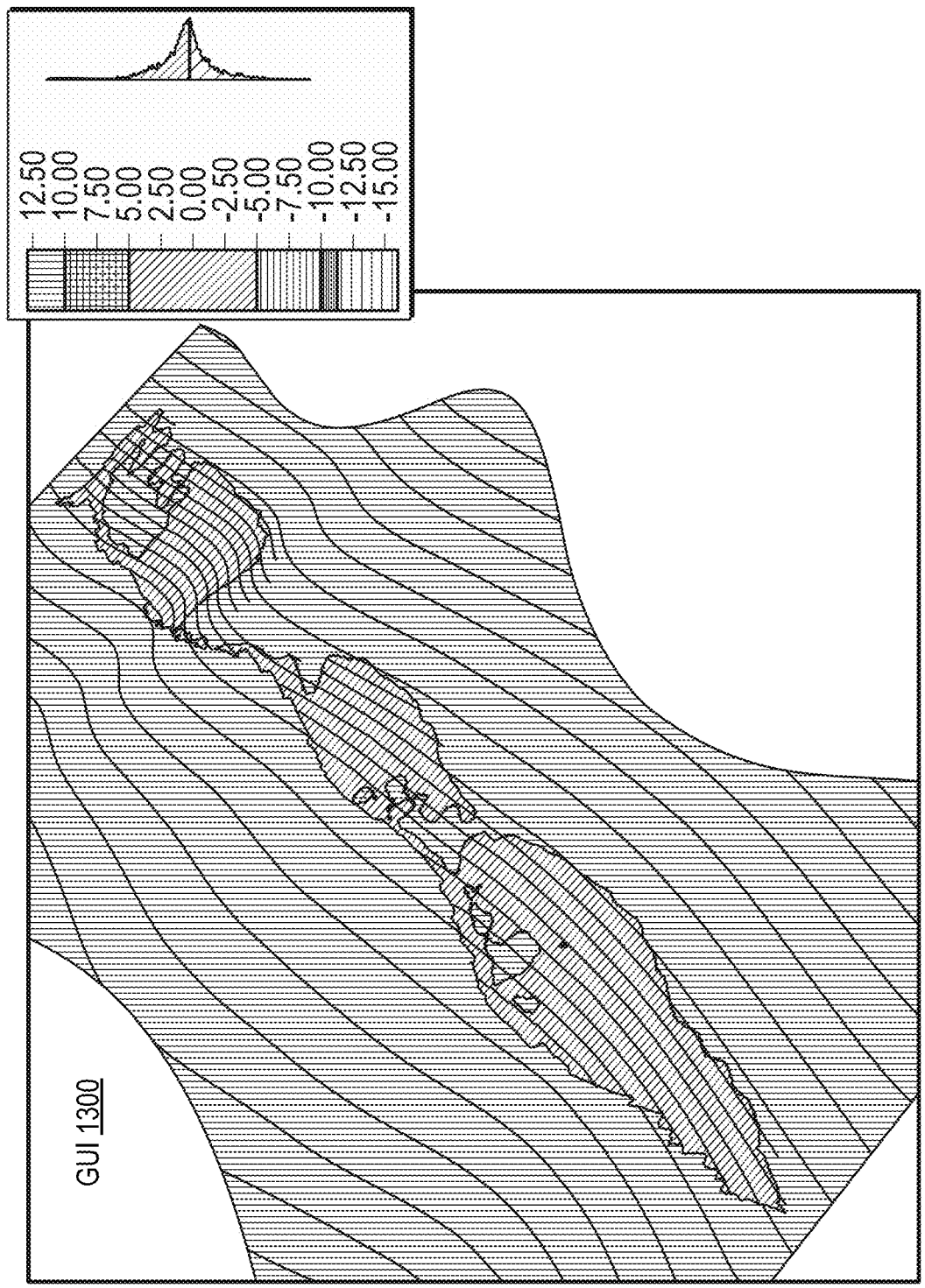
FIG. 13 illustrates an example of a plot.

FIG. 13 shows an example of a plot 1300, which may be a portion of a graphical user interface (GUI) that includes various graphic controls. As an example, a portion of a grid may be represented in a panel of a GUI and may be rendered with information as to an estimation associated with a stairstepped grid. As an example, an analysis module may be executed in a framework that may calculate information such as mis-tie information (e.g., misties). For example, consider an example where mistie between estimated fault positions from stairstepped and structural framework fault positions are calculated and rendered. As an example, a method may aim to generate misties within a mistie limit (e.g., consider about ~+/−2.5 m, etc.). As an example a method can include producing an acceptable approximation of a "real fault" form from one or more stairstepped grids.

As an example, a method can include inputting a stairstepped grid and reconstructing connectivity. As an example, a method can include handling geometry of a stairstep, for example, to adjust for one or more holes, one or more undefined cells and/or one or more "floating" faces.

As an example, with respect to connectivity, an individual fault face may be associated with connection information that specifies to which other faces it may be connected, which may facilitate simulation, etc. As an example, an individual fault face may "know" which face it maps back to in a stairstepped grid. For example, a fault may be represented by fault faces and such fault faces may be associated with mapping and/or connectivity information. As an example, a fault processing module may aim to define individual fault faces where such fault faces may be associated with one or more stairstepped grids.

Figure 14:
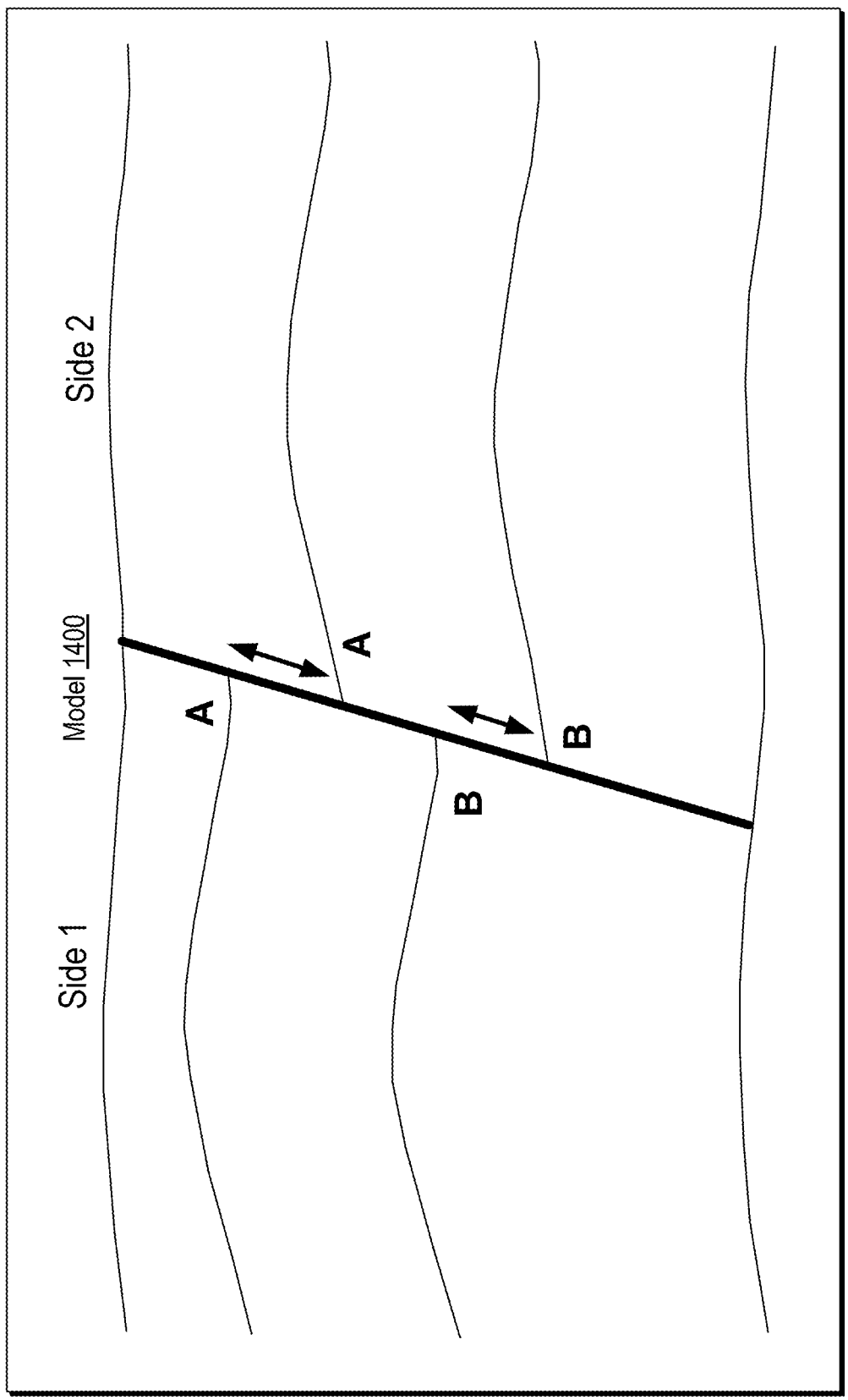
FIG. 14 illustrates an example of a fault and layers.

FIG. 14 shows an example of a portion of a model 1400 that includes a fault that is in a geologic environment where layer boundaries on one side of the fault do not align with layer boundaries on the other side of the fault. As an example, a method can include performing SFA fault offset and property calculations. In such an example, inputs may include distance along a fault face (or fault faces) and, for example, values in the grid of properties in side 1 and side 2. As an example, a method can include face mapping and associated layer mapping. For example, face mapping can be performed with knowledge of layer mapping. Referring again to FIGS. 3 and 4, where stairstepping is employed, layers may be represented by substantially vertical sections (e.g., risers) where a layer on one side of a substantially vertical section differs from a layer on another side of the substantially vertical section. Further, substantially horizontal sections (e.g., treads) may include different layers on an upper side and a lower side. Such representations may be amenable to adjustments via a mapping approach, for example, such that properties and/or connectivities across a stairstepped representation of a fault are adjusted to provide for more "realistic" simulation results based on a model that includes the stairstepped representation of the fault (see, e.g., FIGS. 11 and 12).

Figure 15:
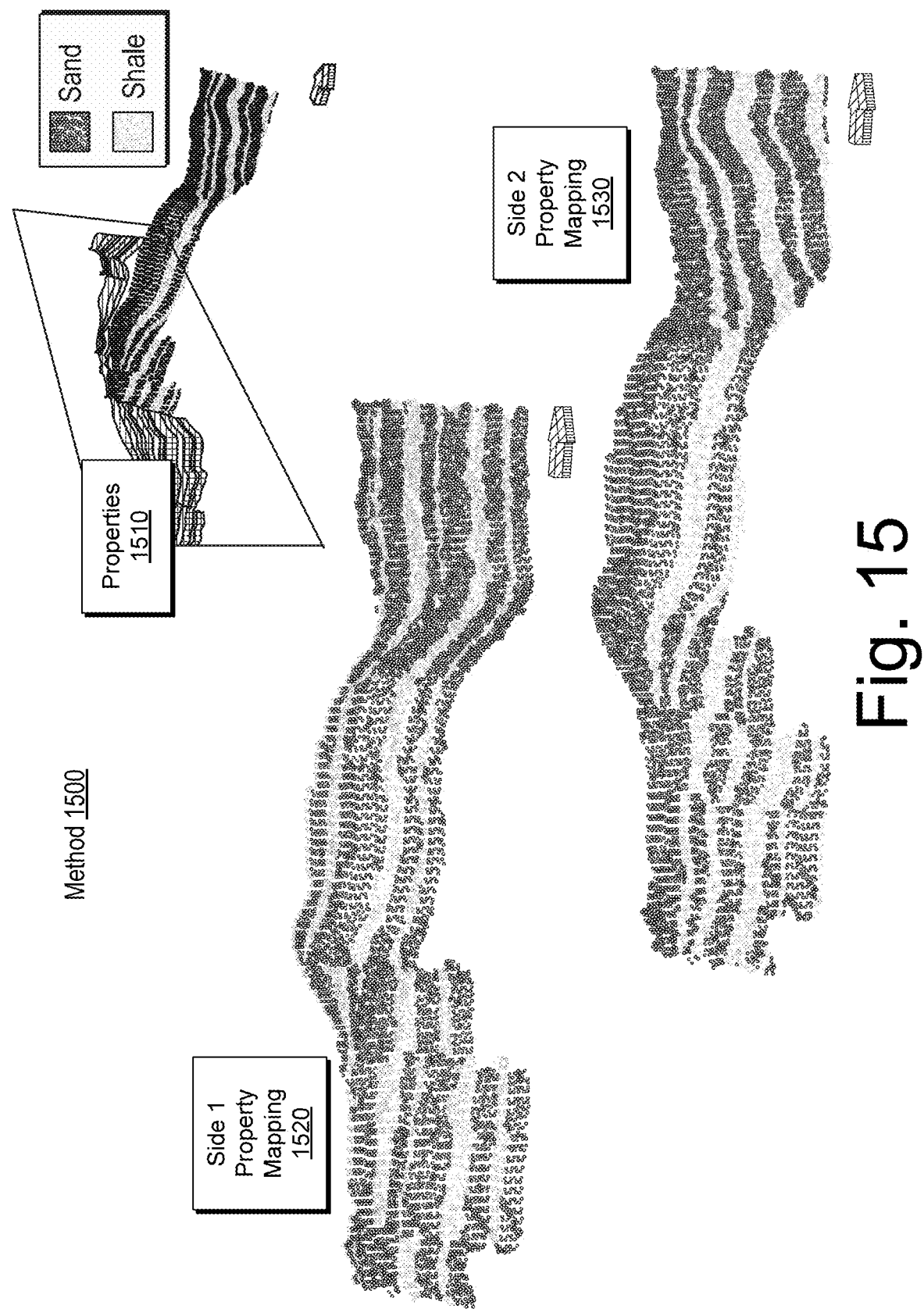
FIG. 15 illustrates an example of a method for a geologic environment that includes layers where such layers may include sand layers and shale layers.

FIG. 15 shows an example of a method 1500 that includes a properties block 1510, for example, for properties of a geologic environment that can include layers such as, for example, sand layers and shale layers (e.g., layers with different properties). In the method 1500, a property mapping block 1520 can be included for mapping properties to one side of a fault and a property mapping block 1530 can be included for mapping properties to another side of the fault (see, e.g., the method 710 of FIG. 7).

Figure 16:
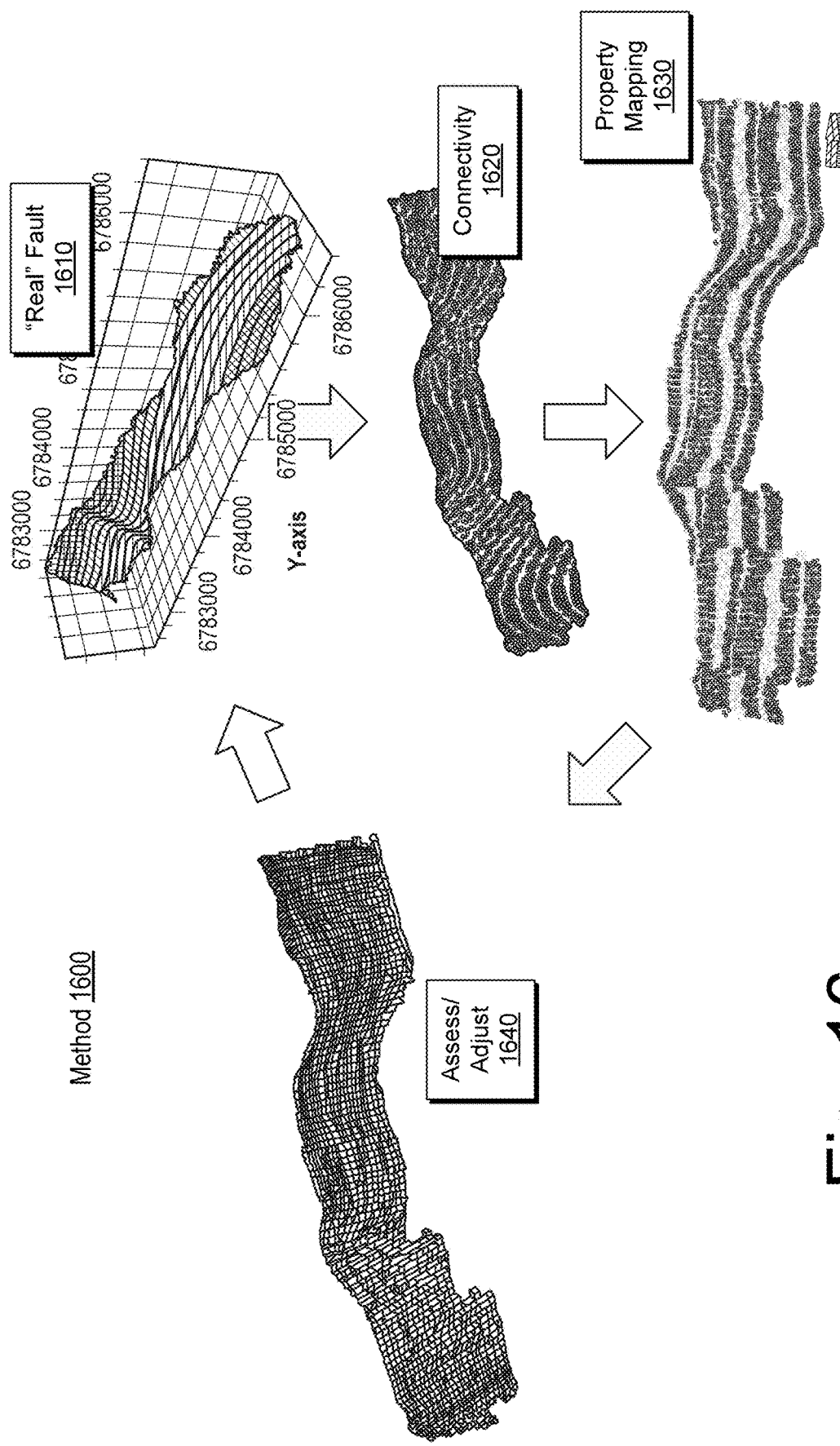
FIG. 16 illustrates an example of a method that includes optionally assessing and/or adjusting information.

FIG. 16 shows an example of a method 1600 that includes a "real" fault input block 1610, a connectivity block 1620, a property mapping block 1630 and an optional assessment and/or adjustment block 1640. As an example, a comparison may be made between a property mapped, connectivity adjusted and property mapped stairstepped grid and "real" fault information as input. Such a method may aim to model a fault using a stairstepped grid with information sufficient to provide an acceptable approximation of the "real" fault information.

As an example, the method 1600 may allow for providing geologically realistic approximations of faults. As an example, a method may include "testing" a resulting representation of a fault against, for example, inputs and other modelling techniques (e.g., SF's). As an example, a test may test against stairstep layering (e.g., and one or more pillar grid equivalents). As an example, as to connections, a test may test against an input grid and, for example, an expected pillar grid form. As an example, a test may include testing fault property population, values and spatial distribution, etc.

Figure 17:
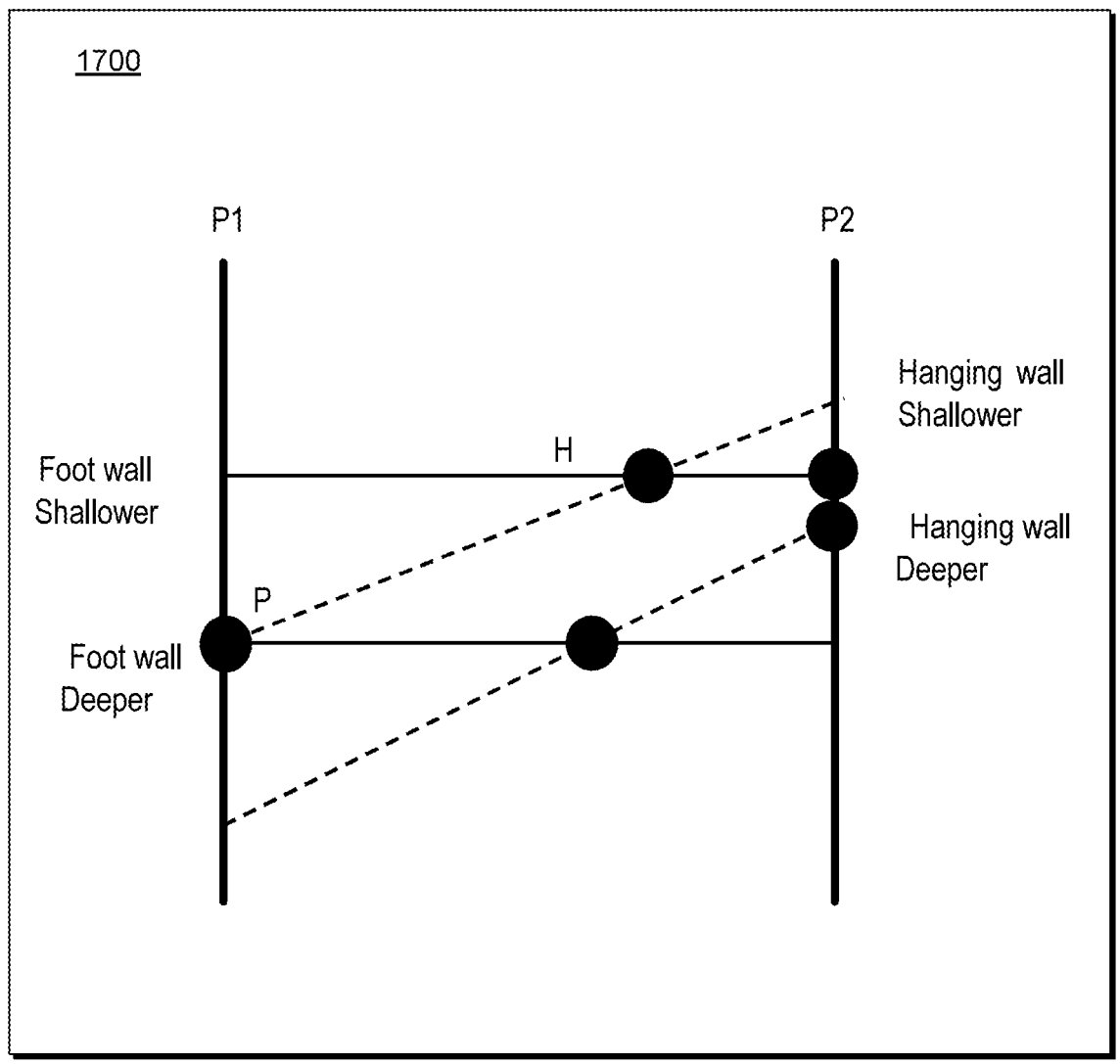
FIG. 17 illustrates an example of a portion of a pillar grid.

FIG. 17 shows an example of two pillars (P1 and P2), which may be part of a pillar grid. For example, consider a pillar grid as may be implemented in the PETREL® framework to model geological entities such as layer stratigraphy, grid properties and faults. As mentioned, a grid may be defined with respect to indexes such I, J and K indexes in three dimensions (e.g., in a Cartesian coordinate system). As an example, a cell in a pillar grid model may be defined by its corners where each corner can include a spatial set of coordinates in a coordinate system. As an example, a grid may be defined by an IJK set of cells (e.g., each with independent cell corner positions). In a pillar grid, pillars may be defined at individual I, J positions (e.g., where K is in a substantially vertical direction). As an example, a pillar may be modelled by a set of control points. As an example, a condition may be set such that cell edges along a K-direction "lock" to a pillar or pillars.

As an example, a fault in a pillar grid may be defined as a set of I, J pillars. In such an example, a condition may be imposed such that a fault follows grid geometry in the K-direction. Such a condition can include trade-offs that may, for example, make certain types of faults more difficult to model. As mentioned, as an example, an approach to modeling faults can include defining one or more stairstepped faults in a pillar grid (e.g., or stair step faults). As an example, a grid may include a stairstepped region that may be defined by a list of grid cell face interfaces, which may be referred to as "fault faces".

As an example, a stairstepped region may be included in a grid where types of calculations such as throw/displacement calculations and transmissibility multiplier calculations may be supported (e.g., via appropriate accounting, etc.).

As an example, to help support various types of operations (e.g., calculations, etc.), a method can in include triangulation of fault faces where "triangulation" can refer to introduction of triangles (e.g., rather than a location mechanism as in navigation). As an example, a method can include triangulation of individual fault faces of a stairstepped region of a grid. In such an example, two shared triangles may exist for individual internal triangle edges. As an example, a method may generate a connected triangular mesh.

As an example, a method may include fixing unconnected internal edges, which may be caused by intersecting faults and K+ face edges which are interfaced by more than one fault face. As an example, a method may include generating a data structure where such a data structure can include and data. For example, consider a method that includes creating a data structure for information for individual fault face corners.

As an example, a framework can include a module that can process fault related information associated with a fault at least partially modeled by a grid (e.g., a region of a grid) where the module can generate a connected, triangulated fault mesh. Such a module may allow the framework to perform various calculations that may include a spatial region that includes at least a portion of a fault modeled by a connected triangulated fault mesh.

As an example, a method can include indexing a set of fault faces to provide information at individual corners. In such an example, the method can provide for access to a linking segment between each corner. For example, consider a segment that may include a pillar grid pillar or a horizon interface against two pillars defining a fault face.

As an example, after indexing, an initial triangulation of a stairstepped fault may be performed. For example, consider a method that includes individually triangulating fault faces and, for example, assigning an integer value identifier to each vertex position (e.g., by an X, Y, Z location, which may be given for unique vertexes).

After triangulation, a checking process may check internal triangle edges, for example, to determine where an individual internal triangle edge is shared by two triangles. For example, such a condition may be violated because of an offset (e.g., an intersecting fault, etc.) along a fault pillar (e.g., where faces making up the original fault are defined on both sides), or by a K+ face edge which is shared by more than one fault face.

As an example, a method can include connecting one or more unconnected internal edges that may be uncovered via a checking process (e.g., optionally of the method). In such an example, the method may include connecting one or more unconnected internal edges via subdividing one or more regions. For example, a subdivision process may be implemented that subdivides a space. As an example, for an individual unconnected edge in a given triangle, a connection algorithm may locate a second triangle that shares a portion of the unconnected edge. In such an example, the two triangles may then be subdivided along the partially connected edge, so that a fraction of the original unconnected edge is now shared by both triangles, and the remainder is left unconnected. Such a process may then be repeated with the remainder until an entire edge is divided and connected on both sides.

As an example, a connection algorithm can include determining whether two triangle edges are partially connected, even though the edge segments may not share the same direction vector. As an example, a connection algorithm may use indexed face information and may handle, for example, the following two cases: Case I for an unconnected pillar edge; and Case II for an unconnected horizon edge.

As mentioned, a method can include extracting information for individual fault face corners. In such an example, a face corner located on a pillar may be associated with an appropriate horizon segment(s) to which it is connected to and may be associated with its appropriate pillar index.

As mentioned, FIG. 17 shows two pillars. As an example, a corner can be a result of two intersecting horizon segments. In such an example, a point can include a reference to each of the intersecting segments from both sides of the fault. As shown in FIG. 17, a corner point H exists that is spatially between the pillar P1 and the pillar P2 along a foot wall (e.g., a shallower foot wall; noting that a deeper foot wall is also shown in FIG. 17).

As an example, a data structure can allow a linking pillar or horizon segment(s) to be found between two adjacent corner points. In FIG. 17, such segments are represented by lines that connect individual corner points to each other.

As mentioned, a method can include triangulating a fault face of a stairstepped grid that represents at least a portion of a fault. As an example, an individual, unique corner XYZ position may be given a unique integer id number. As an example, a face can be divided into triangles, for example, by starting at a first corner in list and stepping around each edge until a set of triangles is created, each of which share a common vertex position; that of the first fault face corner in the list. In such an example, a set of triangles may be generated, for example, where each individual triangle may be defined by three integer values. As an example, an individual triangle can include a reference to its original fault face.

As mentioned, an internal triangle edge may not necessarily be shared by two triangles, which may be determined by a checking process, etc. Such a condition may occur, for example, because of an offset (e.g., an intersecting fault) along a fault pillar (e.g., where faces making up the original fault are defined on both sides) or, for example, by a K+ face edge which is shared by more than one fault face.

Figure 18:
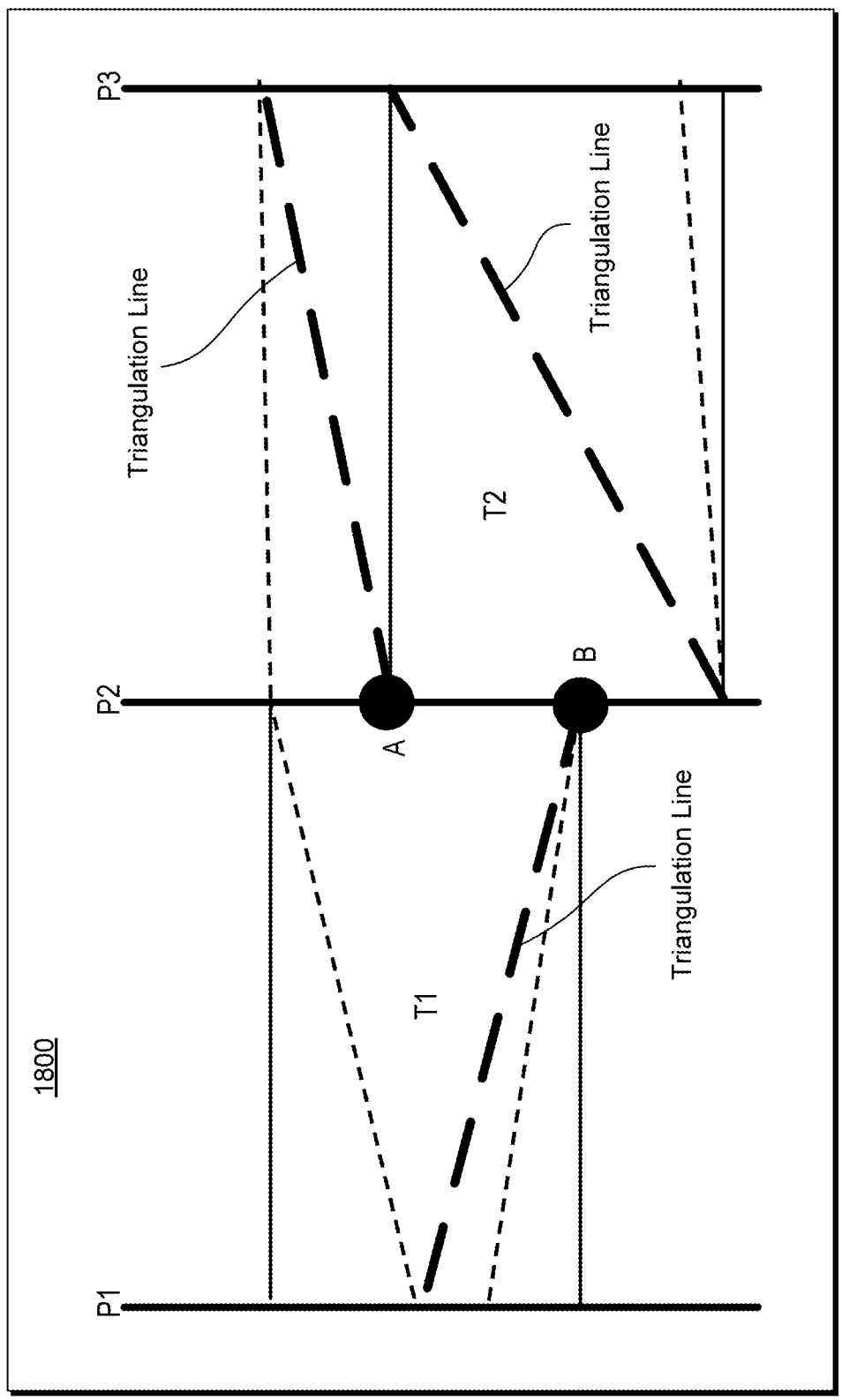
FIG. 18 illustrates an example of a portion of a pillar grid.

FIG. 18 shows an example of a portion of a grid 1800 that includes at the three pillars P1, P2 and P3. In FIG. 18, an example of an offset scenario is illustrated where triangles T1 and T2 partially share an edge along the pillar P2 between points A and B; noting that a portion of the internal edge of the triangle T1 above A is not shared with the triangle T2 and that a portion of the internal edge of the triangle T2 below B is not shared with the triangle T1. Thus, in FIG. 18, an intersecting fault at pillar P2 causes an offset. Also shown in FIG. 18 are triangulation lines as may be introduced during a triangulation process.

As an example, a method can include connecting partially connected internal edges, for example, via a subdivision process. In such an example, for an individual unconnected edge in a given triangle, a connection algorithm can include locating a second triangle that shares a portion of the unconnected edge. In such an example, the two triangles can then be subdivided along the partially connected edge, so that a fraction of the original unconnected edge is now shared by both triangles, and the remainder is left unconnected. Such a process may be repeated with the remainder until the entire edge is divided and connected on both sides. For example, with reference to FIG. 18, the triangle T1 may be subdivided (e.g., split) into two triangles at point A and triangle T2 may be subdivided (e.g., split) into two triangles at point B.

As an example, a connection algorithm can include determining whether two triangle edges are partially connected, for example, even though the edge segments may not share the same direction vector. For example, a direction vector can be different for each partially connected edge because of curvature of a pillar.

As an example, a connection algorithm can receive indexed face corner information. As an example, a connection algorithm may include an ability to handle one or more cases. For example, consider a connection algorithm that can handle one or both of an unconnected pillar edge case and an unconnected horizon edge case.

As an example, a method can include determining what type of unconnected edge may exist. For example, if an edge is defined between two pillar corners on a common pillar, then an "unconnected pillar edge" case algorithm (e.g., or sub-algorithm) may be implemented; whereas, if an edge is defined between two pillar corners on adjacent pillars, then an "unconnected horizon edge" case algorithm (e.g., or sub-algorithm) may be implemented.

As to an unconnected pillar edge case, where a triangle unconnected edge is located on a pillar, such a scenario is illustrated in FIG. 18. As an example, an algorithm can include finding one or more fault face corners on a pillar which is (are) located inside a Z-range of an unconnected edge. For example, in FIG. 18, this would include the corner A of the triangle T2. In such an example, the initial triangle can be then subdivided, for example, at each discovered midpoint (e.g., or as otherwise may be appropriate given one or more conditions, etc.). In such an example, once a process has been completed for individual unconnected edges that may exist along a pillar, a condition may be met such that, for example, there will be no pillar edges that do not share two triangles.

Figure 19:
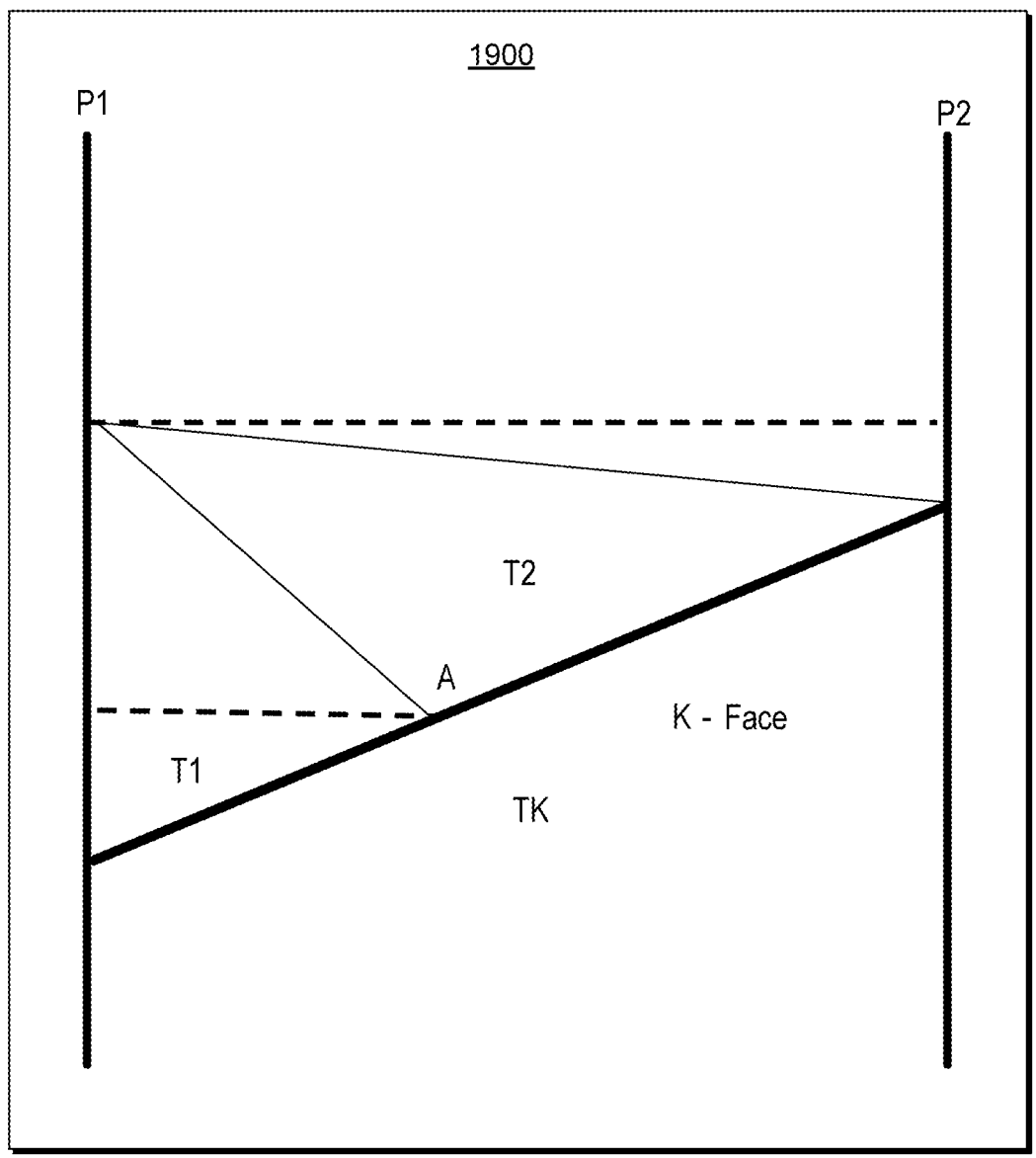
FIG. 19 illustrates an example of a portion of a pillar grid.

As to the case of an unconnected horizon edge of a triangle unconnected edge located between pillars (e.g., along a horizon segment), another algorithm (e.g., or sub-algorithm) may be implemented. FIG. 19 shows an example, of a portion of a grid 1900 that includes a pillar P1 and a pillar P2. In the example of FIG. 19, edges that are unconnected horizon edges are shown to occur. For example, consider the K-Face as a special type of fault face (e.g., extending in a direction out of FIG. 19), defined by an entire interface between two cells that are separated in the K-direction (e.g., of an I, J, K index and coordinate system). In such an example, these faces are included in a stairstepped region of a grid and can make up a horizontal part of a stairstep. In a stairstepped grid region, a K-face edge can extend entirely between two pillars and may, for example, intersect one or more other faces.

As an example, an algorithm can include finding an unconnected triangle edge with corner points between two pillars and selecting indexed face corner information to locate the horizon segment that connects the two pillar corners. In such an example, the algorithm may then splits the edge, for example, based on a list of intersection points stored in a horizon segment data structure, which may be, for example, a horizon segment object (e.g., in an object-oriented programming environment, etc.). As an example, a triangle TK (e.g., which has an edge along the extending between both pillars) is then subdivided at point A, so that it has two triangles, with edges sharing T1 and T2 respectively.

As an example, a method can include processing one or more unconnected edges for a triangulated mesh. As a result, such a triangulated mesh (e.g., spatially filled with triangles) may include, for example, unconnected edges defined at edge(s) of the triangulated mesh.

As an example, a method can include integrating one or more complex faults within a pillar grid or within pillar grids and performing one or more reservoir simulations using at least a portion of information associated with a pillar grid or pillar grids.

As an example, a grid may allow for grid cells to be constructed that are regular in form and allow one or more faults to be laterally and vertically discontinuous within the grid. In such an example, faults may include one or more intersections. As an example, a stairstepped grid can provide a gross scale approach to honoring structurally complex architectures. One or more structures within a grid may be represented by one or more stairstepped grid regions that are stairstepped in form where such structures can deviate locally in connection and geometry from true geological form. For example, a stairstepped grid region may represent a fault in a stairstepped form that deviates locally from a form of the fault in a geologic environment. As an example, a stairstepped representation of a structure may include one or more accompanying geometric conditions that may, for example, cause the stairstepped representation to deviate locally from the actual physical character (e.g., spatial character, etc.) of the structure in a geologic environment.

As an example, a framework may include one or more modules that can be executed by a processor or processors to create one or more stairstepped grids with stairstepped fault forms. As an example, such grids may be generated from geological realistically fault shapes. As an example, once such stairstepped fault forms are created, analysis of the stairstepped grid fault forms may be limited at least in part by stairstepped geometry. For example, computation of throws of faults and throw related fault seal properties may be limited at least in part by a stairstepped geometry.

As an example, a method can include jointly modeling geology from an original fault model and stratigraphic and property layering from a stairstepped grid and retaining a link between these two models. In such an example, an initial fault model can be used to define the geometric parameters and the stairstepped grid can be used to define the stratigraphic layer properties. By retaining a link between the two fault models (original and stairstepped) then both the geometry and the layer properties can be combined to produce a solution that attempts to honor both the geometric form and the layering along the faults. However, such an approach may depend at least in part on the two model types co-existing and being intimately inter-linked, which may not be the case in some scenarios.

As an example, a method can include using a stair-step grid (e.g., optionally in isolation, etc.) to produce an estimate of both a true geological fault form and layering form. Such an approach may allow for removing a dependency on multiple object co-existence. In turn, such an approach may allow for more variety on how a grid can be constructed and persisted.

As an example, a method can include estimating realistic fault forms and fault connection data directly from stairstepped grids. As an example, a method can include projection of stairstepped faults into more geologically realistic fault forms while retaining the fault face connection and grid property data connections present within the stairstepped grid. Such an approach can allows for geologically realistic layering and connection estimations to be generated for the faults and that data to be used to better estimate geological distributions of properties along the faults. In such an example, those property estimations can then be applied back onto the stairstepped faults. Such an approach can allow for structurally complex large scale models to be constructed with stairstepped grids, which can be consumed by one or more reservoir simulators (e.g., where detailed local geological forms and properties of faults may be honored).

As an example, a method can include supplying a stairstepped grid (e.g., inputting a stairstepped grid). In such a method, for each fault in the grid, fault geometry data may be extracted and a geological estimate of the real fault form (e.g., not in a stairstepped representation) may be created. Such a fault form may be generated in a manner such that it honors the local geometric form of the fault (e.g., without incorporating the stairsteps in the fault).

As an example, once a geologically realistic fault form is established, a method can include projecting connection data from the stairstepped grid onto the estimated fault form surface. In such an example, the projection can modify the shape and size of the stairstepped grid connections so that it provides a more geologically reasonable estimate of the geological layers.

As an example, a result can be layering on an idealized fault form for both the hangingwall and footwall sides of the fault.

As an example, data can then be used to estimate connections and connection geometries across a fault and, for example, used to estimate fault offsets and fault offset related properties such as fault clay content, fault rock thickness, fault permeability, fault sealing capacity, fault column height support and fault transmissibility multipliers. As an example, such data may then be mapped back from an idealized fault form onto the original stairstepped grid connections.

As an example, an understanding of one or more differences in geometry and predicted properties between an initial stairstepped fault form and an idealized fault form may be used to modify one or more computed parameters, for example, to better estimate one or more connection parameters (e.g. transmissibility and threshold pressure), which may achieve an improved accuracy in modelled flow behavior in a reservoir fluid flow simulator.

As an example, a method can allow for stairstepped grids to be used to define both the course scale structural architecture and, for example, to know detailed geological architecture and its associated properties. As an example, with knowledge of a likely estimated "real" geometry and property distribution across one or more faults and actual geometry, property distribution of stairstepped grid faults parameters can be defined that better honor likely flow behavior across faults in stairstepped grids. A method may, for example, allow for one or more structured simulators to consume one or more stairstepped grids that can honor both large scale complex architectures and local fault geometries and properties.

As an example, one or more faults may be modeled as a set or sets of cells, nodes, etc. that resemble a set or sets of stairs (e.g., which include vertical zigzags, etc.). As an example, a method can include estimation of realistic fault forms and fault connection data, for example, directly from stairstepped grids. Such an approach can allow for projection of stairstepped faults and more geologically realistic fault forms while, for example, retaining fault face connections and grid property data connections present within the stairstepped grid. Such an approach may allow for geologically realistic layering and connection estimations to be generated for one or more faults and that data to be used to better estimate geological distributions of properties along the faults. As an example, property estimations may be applied back onto a stairstepped fault, which may allow for structurally complex large scale models to be constructed with stairstepped grids, which can be consumed by one or more reservoir simulators, for example, where detailed local geological forms and properties of faults may be honored.

As an example, one or more of the example method can include or be associated with various computer-readable media (CRM) blocks. Such blocks generally include instructions suitable for execution by one or more processors (or processor cores) to instruct a computing device or system to perform one or more actions. While various blocks are shown, a single medium may be configured with instructions to allow for, at least in part, performance of various actions of one or more methods. As an example, a computer-readable medium (CRM) may be a computer-readable storage medium that is non-transitory and that is not a carrier wave.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2, etc.

As an example, a method can include receiving a stairstepped grid that represents at least a portion of a fault in a geologic environment; adjusting the stairstepped grid to provide an adjusted stairstepped grid; and simulating flow in at least a portion of the geologic environment using the adjusted stairstepped grid. In such a method adjusting can include adjusting connectivity, adjusting properties, etc. As an example, a method can include accessing a non-stairstepped representation of the at least a portion of a fault.

As an example, a method can include adjusting connectivity of a portion of a stairstepped grid on one side of a discontinuity with respect to a portion of a stairstepped grid on another side of the discontinuity. As an example, discontinuity can be or include a fault.

As an example, a method can include mapping where mapping includes projecting nodes of a stairstepped grid to a surface. In such an example, the positions of the projected nodes on the surface may be utilized for geometric calculations that can provide information to adjust one or more properties.

As an example, a method can include discretizing a surface that represents a discontinuity, for example, consider a method that includes triangulating a surface to define a triangulated surface. As an example, discretizing can be based at least in part on mapping of features of a stairstepped grid to a surface. For example, consider a method that includes discretizing a surface that represents a discontinuity based at least in part on locations of nodes of a stairstepped grid as projected onto the surface. While nodes are mentioned, as an example, edges may be mapped, cell-centers may be mapped, or a combination of features of a stairstepped grid may be mapped to a surface that represents a discontinuity. As an example, one or more features of a stairstepped grid may be mapped to a surface or surfaces as part of a method that includes adjusting properties and/or connectivities of a model of a subterranean environment that includes the stairstepped grid. Such a model may be utilized in a simulator, for example, consider a flow simulator.

As an example, a method can include mapping a stairstepped grid to one side of a surface. As an example, a method can include mapping a stairstepped grid to two opposing sides of a surface where, for example, the method can include adjusting connectivity of cells of the stairstepped grid based at least in part on the mapping. In such an example, cells may represent layers of rock and adjacent cells may, at one or more locations in a model, represent different types of rock. As an example, a method may include information pertaining to lithofacies. As an example, a method may include use of subdivisions where two adjacent subdivisions may be distinguished from each other at least in part on the basis of lithology (e.g., facies characterized by particular lithologic features).

As an example, a method can include calculating transmissibilities based at least in part on one or more of adjusted properties. For example, a method can include mapping one or more features of a stairstepped grip to a surface that represents a discontinuity and adjusting one or more properties of rock associated with the stairstepped grid and calculating transmissibilities based at least in part on the one or more adjusted properties.

As an example, a system can include a processor; memory operatively coupled to the processor; and one or more modules that include processor-executable instructions stored in the memory to instruct the system, the instructions including instructions to receive a stairstepped grid that represents at least a portion of a fault in a geologic environment; adjust the stairstepped grid to provide an adjusted stairstepped grid; and simulate flow in at least a portion of the geologic environment using the adjusted stairstepped grid. In such an example, the discontinuity can be or include a fault. As an example, a fault can extend across layers of a model where the layers differ as to rock composition (e.g., lithology, etc.). As an example, a model may include a stairstepped grid that represents a fault that extends through layers of rock where the layers include at least one sand layer and at least one shale layer. As an example, a system can include instructions for adjusting properties and/or connectivities of a model that includes such as stairstepped grid, for example, to provide for more accurate simulation of flow with respect to a subterranean environment that includes different layers such as, for example, at least one sand layer and at least one shale layer.

As an example, one or more computer-readable storage media can include computer-executable instructions to instruct a computer where the instructions include instructions to: receive a stairstepped grid that represents at least a portion of a fault in a geologic environment; adjust the stairstepped grid to provide an adjusted stairstepped grid; and simulate flow in at least a portion of the geologic environment using the adjusted stairstepped grid. In such an example, spatial discrepancies can be or include length mismatches between risers and/or treads of the stairstepped grid and lengths along the surface. As an example, a surface can include two opposing sides where, for example, instructions to map can include instructions to map a stairstepped grid to each of the two opposing sides (e.g., to generate one or more maps, which may be information about spatial positions such as spatial positions of nodes of a grid with respect to mapping of those nodes to a surface, etc.). As an example, a discontinuity can be or include a fault where layers of rock exist on one side of the fault and layers of rock exist on another side of the fault. In such an example, layers may be offset spatially, for example, shifted such that layer boundaries do not align across the fault (e.g., in a substantially horizontal direction).

Figure 20:
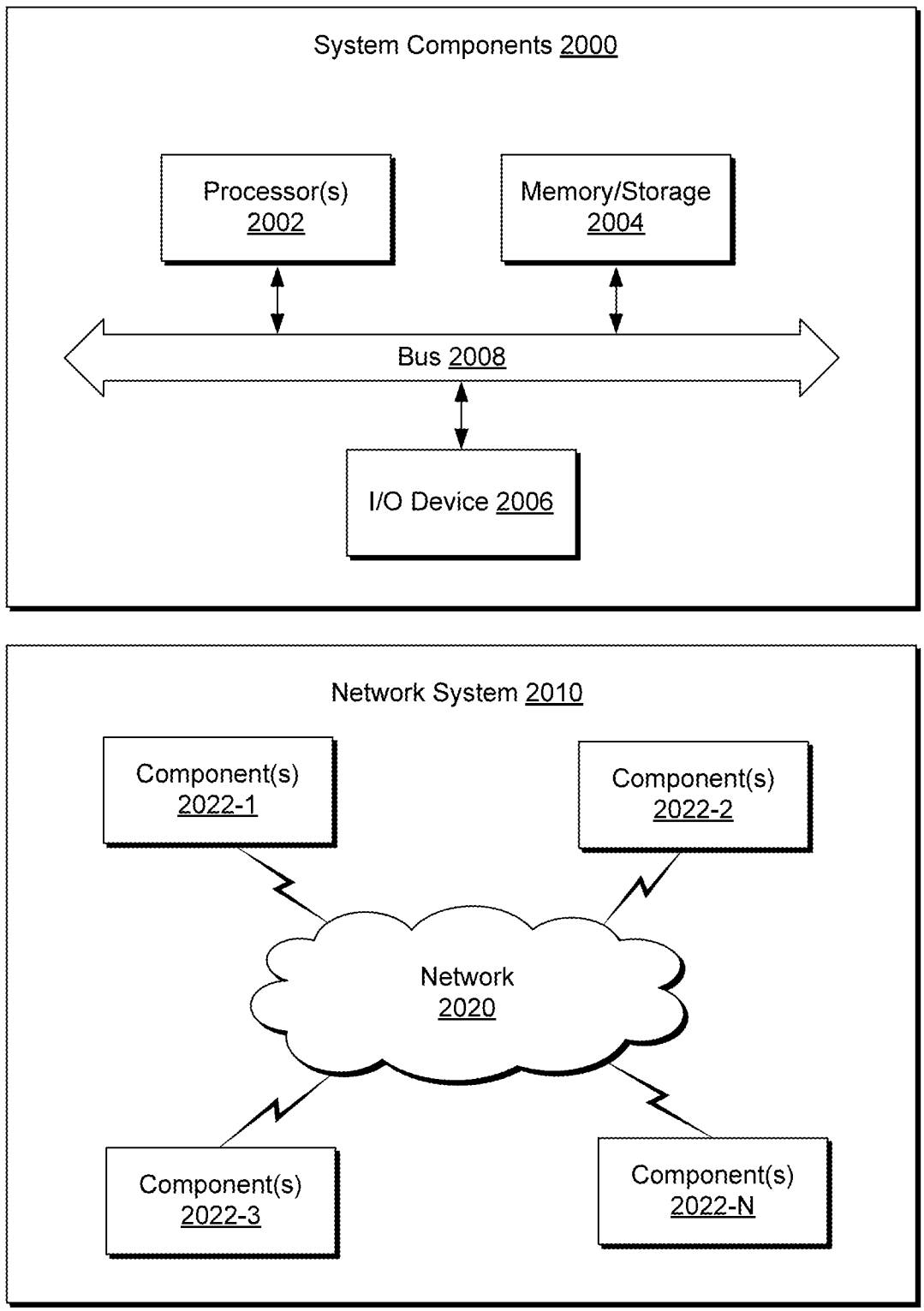
FIG. 20 illustrates example components of a system and a networked system.

FIG. 20 shows components of an example of a computing system 2000 and an example of a networked system 2010. The system 2000 includes one or more processors 2002, memory and/or storage components 2004, one or more input and/or output devices 2006 and a bus 2008. In an example embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2002-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   mapping a stairstepped grid to a surface wherein the stairstepped grid and the surface represent a discontinuity in a geologic environment, wherein the stairstepped grid comprises cuboid shaped grid cells and wherein the mapping accounts for spatial discrepancies between the stairstepped grid and the surface;
   based at least in part on the mapping, for adjacent cuboid shaped grid cells that represent material on one side of the discontinuity and material on another side of the discontinuity, without reshaping the adjacent cuboid shaped grid cells, adjusting physical properties and adjusting connectivity to compensate for the spatial discrepancies between the stairstepped grid and the surface, wherein adjusting physical properties comprises adjusting permeability and wherein adjusting connectivity comprises adjusting transmissibility; and
   simulating flow in the geologic environment using a flow simulator, the stairstepped grid to represent the discontinuity, the adjusted physical properties and the adjusted connectivity to compensate for the spatial discrepancies between the stairstepped grid and the surface to generate simulation results.

2. The method of claim 1 wherein adjusting connectivity comprises adjusting connectivity of a portion of the stairstepped grid on the one side of the discontinuity with respect to a portion of the stairstepped grid on the other side of the discontinuity.

3. The method of claim 1 wherein the discontinuity comprises a fault.

4. The method of claim 1 wherein the mapping comprises projecting nodes of the stairstepped grid to the surface.

5. The method of claim 1 comprising discretizing the surface.

6. The method of claim 5 wherein the discretizing comprises triangulating the surface to define a triangulated surface.

7. The method of claim 5 wherein the discretizing is based at least in part on the mapping.

8. The method of claim 4 comprising discretizing the surface based at least in part on locations of the nodes of the stairstepped grid as projected onto the surface.

9. The method of claim 1 comprising mapping the stairstepped grid to one side of the surface.

10. The method of claim 1 comprising mapping the stairstepped grid to two sides of the surface.

11. The method of claim 1 comprising adjusting transmissibility based at least in part on one or more of the adjusted physical properties.

12. A system comprising:
    a processor;
    memory operatively coupled to the processor; and
    processor-executable instructions stored in the memory to instruct the system, the instructions comprising instructions to:
    map a stairstepped grid to a surface wherein the stairstepped grid and the surface represent a discontinuity in a geologic environment, wherein the stairstepped grid comprises cuboid shaped grid cells and wherein the mapping accounts for spatial discrepancies between the stairstepped grid and the surface;
    based at least in part on the mapping, for adjacent cuboid shaped grid cells that represent material on one side of the discontinuity and material on another side of the discontinuity, without reshaping the adjacent cuboid shaped grid cells, adjust physical properties and adjust connectivity to compensate for the spatial discrepancies between the stairstepped grid and the surface, wherein the physical properties comprise permeability and wherein the connectivity comprises transmissibility; and
    simulate flow in the geologic environment using the stairstepped grid to represent the discontinuity, the adjusted physical properties and the adjusted connectivity to compensate for the spatial discrepancies between the stairstepped grid and the surface to generate simulation results.

13. The method of claim 3 wherein the fault extends across layers of a model wherein the layers differ as to rock composition.

14. The method of claim 13 wherein the layers comprise a sand layer and a shale layer.

15. One or more non-transitory computer-readable storage media comprising computer-executable instructions to instruct a flow simulator, the instructions comprising instructions to:
    map a stairstepped grid to a surface wherein the stairstepped grid and the surface represent a discontinuity in a geologic environment, wherein the stairstepped grid comprises cuboid shaped grid cells and wherein the mapping accounts for spatial discrepancies between the stairstepped grid and the surface;
    based at least in part on the mapping, for adjacent cuboid shaped grid cells that represent material on one side of the discontinuity and material on another side of the discontinuity, without reshaping the adjacent cuboid shaped grid cells, adjust physical properties and adjust connectivity to compensate for the spatial discrepancies between the stairstepped grid and the surface, wherein the physical properties comprise permeability and wherein the connectivity comprises transmissibility; and
    simulate flow in the geologic environment using the stairstepped grid to represent the discontinuity, the adjusted physical properties and the adjusted connectivity to compensate for the spatial discrepancies between the stairstepped grid and the surface to generate simulation results.

16. The one or more non-transitory computer-readable storage media of claim 15 wherein the spatial discrepancies comprise length mismatches between risers and/or treads of the stairstepped grid and lengths along the surface.

17. The one or more non-transitory computer-readable storage media of claim 15 wherein the instructions to map comprise instructions to map the stairstepped grid to each of two sides of the surface.

18. The one or more non-transitory computer-readable storage media of claim 15 wherein the discontinuity comprises a fault.

19. The method of claim 1 comprising based at least in part on the simulation results, performing an operation with respect to the geologic environment, wherein the operation comprises a member selected from a group consisting of sensing, drilling, injection and extracting.

* * * * *